US012440554B2

(12) United States Patent
Hartigan-O'Connor et al.

(10) Patent No.: US 12,440,554 B2
(45) Date of Patent: Oct. 14, 2025

(54) VACCINATION USING HERPESVIRUS GENOMES IN NUCLEIC ACID FORM

(71) Applicant: The Regents of the University of California, Oakland, CA (US)

(72) Inventors: Dennis Hartigan-O'Connor, Davis, CA (US); Peter Barry, Davis, CA (US); Jesse Deere, Davis, CA (US); Joseph Dutra, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 933 days.

(21) Appl. No.: 17/510,969

(22) Filed: Oct. 26, 2021

(65) Prior Publication Data

US 2022/0105173 A1 Apr. 7, 2022

Related U.S. Application Data

(63) Continuation of application No. PCT/US2020/031117, filed on May 1, 2020.

(60) Provisional application No. 62/842,419, filed on May 2, 2019.

(51) Int. Cl.
| | | |
|---|---|---|
| *A61K 39/245* | (2006.01) | |
| *A61K 39/00* | (2006.01) | |
| *C12N 7/00* | (2006.01) | |

(52) U.S. Cl.
CPC .... *A61K 39/245* (2013.01); *A61K 39/001186* (2018.08); *C12N 7/00* (2013.01); *C12N 2710/16034* (2013.01); *C12N 2710/16043* (2013.01); *C12N 2710/16045* (2013.01)

(58) Field of Classification Search
CPC .......... A61K 39/245; A61K 39/001186; A61K 2039/53; A61K 2039/6006; A61K 2039/6075; A61K 2039/6093; A61K 39/12; A61K 2039/5256; C12N 7/00; C12N 2710/16034; C12N 2710/16043; C12N 2710/16045; C12N 2740/16234; C12N 2710/16143; C12N 2740/15034; C12N 2740/16222; C12N 15/86; A61P 31/22

See application file for complete search history.

(56) References Cited

U.S. PATENT DOCUMENTS

| | | | | |
|---|---|---|---|---|
| 2002/0110543 | A1* | 8/2002 | Chiocca | C12N 7/00 435/456 |
| 2013/0142823 | A1* | 6/2013 | Picker | A61K 39/245 435/5 |
| 2023/0087396 | A1* | 3/2023 | Hartigan-O'Connor | C12N 15/86 424/186.1 |

FOREIGN PATENT DOCUMENTS

| | | |
|---|---|---|
| WO | 2014018117 A1 | 1/2014 |
| WO | 2020223673 A1 | 11/2020 |

OTHER PUBLICATIONS

Wussow F, Fickenscher H, Tischer BK. Red-mediated transposition and final release of the mini-F vector of a cloned infectious herpesvirus genome. PLoS One. Dec. 4, 2009;4(12):e8178. (Year: 2009).*
Knickmann J, Staliunaite L, Puhach O, Ostermann E, Günther T, Nichols J, Jarvis MA, Voigt S, Grundhoff A, Davison AJ, Brune W. A simple method for rapid cloning of complete herpesvirus genomes. Cell Rep Methods. Feb. 26, 2024;4(2):100696. Epub Jan. 23, 2024. (Year: 2024).*
Richards et al 2016; Richards AL, Sollars PJ, Smith GA. New tools to convert bacterial artificial chromosomes to a self-excising design and their application to a herpes simplex virus type 1 infectious clone. BMC Biotechnol. Aug. 31, 2016;16(1):64. (Year: 201).*
Tischer BK, Kaufer BB. Viral bacterial artificial chromosomes: generation, mutagenesis, and removal of mini-F sequences. J Biomed Biotechnol. 2012;2012:472537. doi: 10.1155/2012/472537. Epub Feb. 23, 2012. (Year: 2012).*
Koraimann G. Spread and Persistence of Virulence and Antibiotic Resistance Genes: A Ride on the F Plasmid Conjugation Module. EcoSal Plus. Jul. 2018;8(1):10.1128/ecosalplus.ESP-0003-2018. (Year: 2018).*
McVoy MA, Nixon DE, Adler SP, Mocarski ES. Sequences within the herpesvirus-conserved pac1 and pac2 motifs are required for cleavage and packaging of the murine cytomegalovirus genome. J Virol. Jan. 1998;72(1):48-56. (Year: 1998).*
Iwaisako Y, Fujimuro M. The Terminase Complex of Each Human Herpesvirus. Biol Pharm Bull. 2024;47(5):912-916. (Year: 2024).*
Wang JB, McVoy MA. A 128-base-pair sequence containing the pac1 and a presumed cryptic pac2 sequence includes cis elements sufficient to mediate efficient genome maturation of human cytomegalovirus. J Virol. May 2011;85(9):4432-9. Epub Feb. 23, 2011. (Year: 2011).*
Tong L, Stow ND. Analysis of herpes simplex virus type 1 DNA packaging signal mutations in the context of the viral genome. J Virol. Jan. 2010;84(1):321-9. (Year: 2010).*
Adelman K, Salmon B, Baines JD. Herpes simplex virus DNA packaging sequences adopt novel structures that are specifically recognized by a component of the cleavage and packaging machinery. Proc Natl Acad Sci U S A. Mar. 13, 2001;98(6):3086-91. (Year: 2001).*
Ligat G, Cazal R, Hantz S, Alain S. The human cytomegalovirus terminase complex as an antiviral target: a close-up view. FEMS Microbiol Rev. Mar. 1, 2018;42(2):137-145. (Year: 2018).*

(Continued)

*Primary Examiner* — Rachel B Gill
(74) *Attorney, Agent, or Firm* — Kilpatrick Townsend & Stockton LLP

(57) ABSTRACT

The present invention provides compositions and methods for inducing immune responses in subjects using HV-based vectors that can be grown in single celled organisms and administered in their nucleic acid form.

38 Claims, 10 Drawing Sheets

(56) References Cited

OTHER PUBLICATIONS

Warden C, Tang Q, Zhu H. Herpesvirus BACs: past, present, and future. J Biomed Biotechnol. 2011;2011:124595. Epub Oct. 27, 2010. Erratum in: Biomed Res Int. Jul. 8, 2019;2019:6870815. (Year: 2010).*

Lufino MM, Edser PA, Wade-Martins R. Advances in high-capacity extrachromosomal vector technology: episomal maintenance, vector delivery, and transgene expression. Mol Ther. Sep. 2008;16(9):1525-38. Epub Jul. 15, 2008. (Year: 2008).*

Zhou F, Li Q, Wong SW, Gao SJ. Autoexcision of bacterial artificial chromosome facilitated by terminal repeat-mediated homologous recombination: a novel approach for generating traceless genetic mutants of herpesviruses. J Virol. Mar. 2010;84(6):2871-80. Epub Jan. 13, 2010. (Year: 2010).*

Barry et al., "Cytomegalovirus (CMV)-Vectored Vaccines for HIV and Other Pathogens", AIDS, vol. 34, No. 3, Mar. 1, 2020, pp. 335-349.

Borenstein et al., "Cloning Human Herpes Virus 6A Genome into Bacterial Artificial Chromosomes and Study of DNA Replication Intermediates", PNAS, vol. 106, No. 45, Nov. 10, 2009, pp. 19138-19143.

European Application No. 20798360.2, "Extended European Search Report", Dec. 21, 2022, 7 pages.

Epstein et al., "HSV-1-Derived Amplicon Vectors: Recent Technological Improvements and Remaining Difficulties—A Review", Memorias do Instituto Oswaldo Cruz, Rio de Janeiro, vol. 104, No. 3, May 2009, pp. 399-410.

Novopro, "pIndigo BAC-5 Vector Map and Sequence", Available Online at: https://www.novoprolabs.com/vectorN05427, Dec. 18, 2018, pp. 1-4.

International Application No. PCT/US2020/031117, "International Search Report and Written Opinion", Aug. 18, 2020, 10 pages.

\* cited by examiner

FIG. 1A
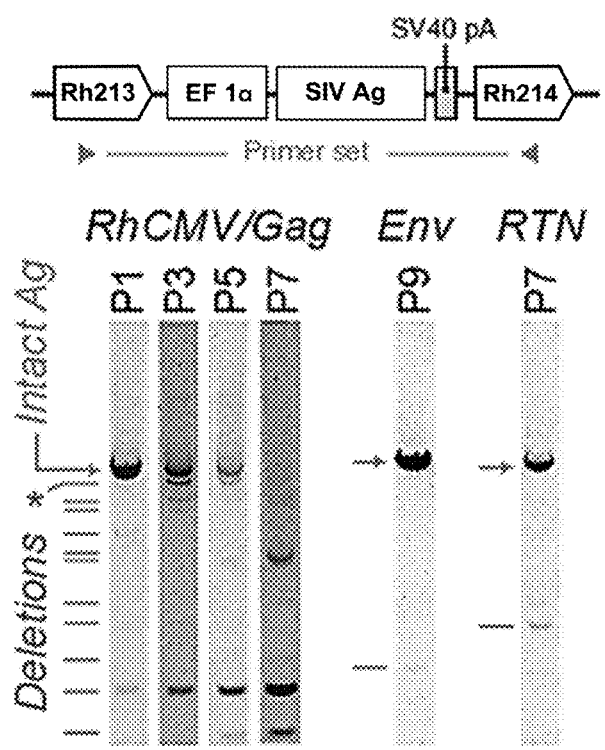
FIG. 1B
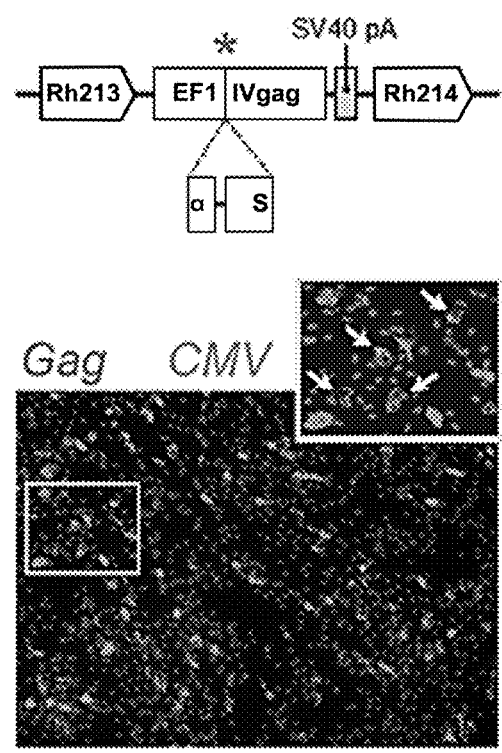
FIG. 1C

FIG. 4A
*1st generation*
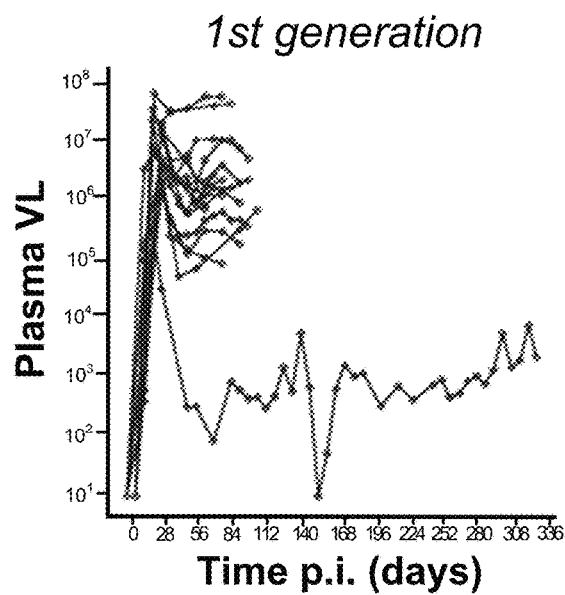
FIG. 4B
*Viral IL-10 deficient*
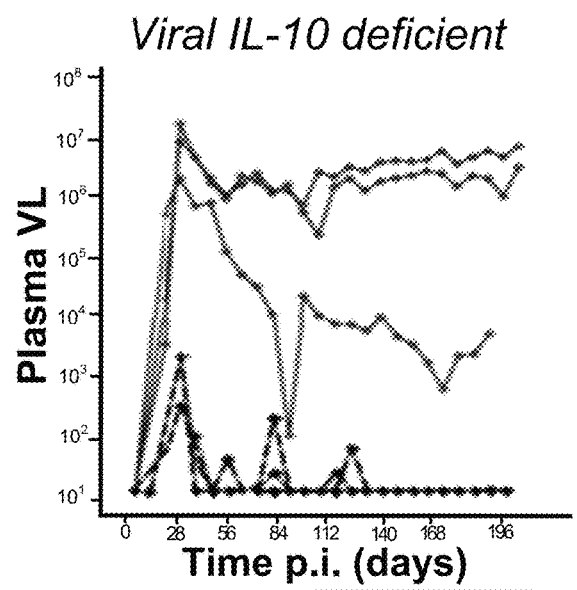
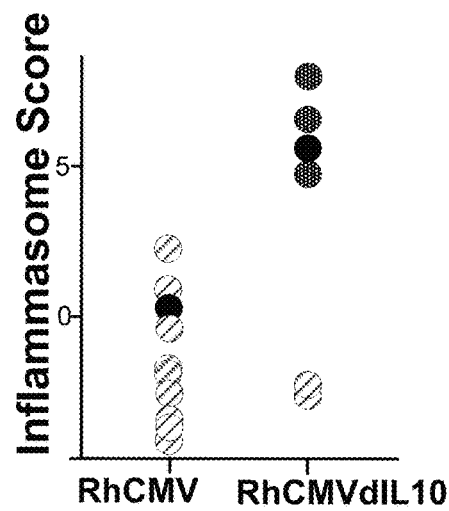
FIG. 4C
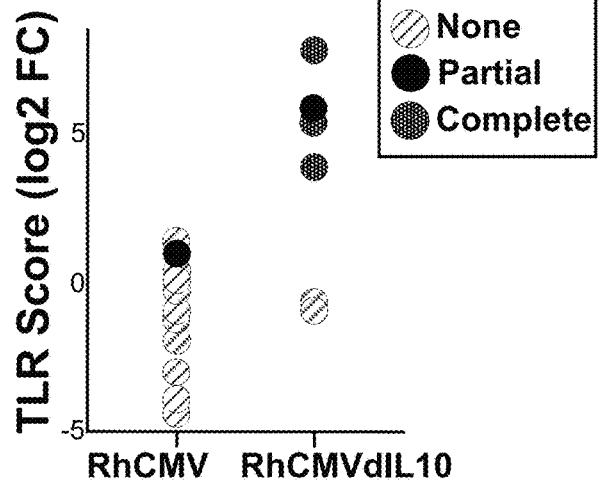
FIG. 4D

US 12,440,554 B2

VACCINATION USING HERPESVIRUS GENOMES IN NUCLEIC ACID FORM

CROSS REFERENCE TO RELATED APPLICATIONS

The present application is a continuation of International Appl. No. PCT/US2020/031117, filed May 1, 2020, which claims priority to U.S. Provisional Pat. Appl. No. 62/842,419, filed on May 2, 2019, the disclosures of which are incorporated herein by reference in their entirety.

STATEMENT AS TO RIGHTS TO INVENTIONS MADE UNDER FEDERALLY SPONSORED RESEARCH AND DEVELOPMENT

This invention was made with Government support under grant number AI131568 awarded by the National Institutes of Health. The Government has certain rights in the invention.

BACKGROUND OF THE INVENTION

Cytomegaloviruses (CMV) and other herpesviruses (HV) represent a promising vaccine platform for protection of people against infectious diseases and cancer. These vaccines are based on recombinant Cytomegalovirus or other HV genomes that are recovered as a replicating virus in tissue culture, which is then expanded by serial passage, purified, and concentrated. This platform faces numerous challenges, however, including that mutations can be introduced into Cytomegalovirus- and other HV-based vaccines during serial passage, that the use of viral particles presents constraints in terms of need for refrigeration, and that many individuals have antibodies against CMV and HV proteins and therefore mount immune reactions against such viral vaccines. There is therefore a need for new, stable vaccines that can be used, e.g., in patients with anti-CMV or HV antibodies and in the absence of the cold chain. The present invention addresses these and other needs.

BRIEF SUMMARY OF THE INVENTION

The present invention provides compositions and methods for inducing immune responses in subjects using HV-based vectors that can be grown in single-celled organisms and administered in their nucleic acid form. In one aspect, the invention provides a recombinant polynucleotide comprising (a) a herpesvirus (HV) genome or a substantial portion thereof; (b) a sequence comprising an origin of replication that functions in a single-celled organism; (c) one or more terminase complex recognition loci (TCRL) comprising a recombinantly introduced polynucleotide sequence that can direct cleavage by an HV terminase complex; wherein the HV genome or portion thereof is separated from the sequence comprising an origin of replication by a TCRL; wherein the HV genome or portion thereof abuts a TCRL at at least one extremity; and wherein the sequence comprising the origin of replication abuts a TCRL at at least one extremity.

In some embodiments, the polynucleotide is circular. In some embodiments, the polynucleotide is linear. In some embodiments, the origin of replication is a bacterial artificial chromosome (BAC) origin of replication. In some embodiments, the origin of replication is a yeast artificial chromosome (YAC) origin of replication. In some embodiments, the HV is a Cytomegalovirus (CMV), Epstein-Barr virus (EBV), herpes simplex virus (HSV), or Rhesus monkey rhadinovirus (RRV).

In some embodiments, the sequence comprising the origin of replication that functions in a single-celled organism further comprises a nucleic acid sequence encoding one or more HV replication proteins. In some embodiments, the one or more HV replication proteins are selected from the group consisting of HCMV proteins UL44, UL54, UL57, UL70, UL84, UL102, UL105, IE2, UL36, UL37, UL38, UL112-113, IRS1/TRS1, homologs thereof, and combinations thereof. In some embodiments, the HV genome or portion thereof comprises a nucleic acid sequence encoding a heterologous antigen. In some embodiments, the HV genome or portion thereof abuts a TCRL at both extremities. In some embodiments, one or more of the TCRLs comprises two HV genome terminal repeats or portions thereof. In some embodiments, the two HV genome terminal repeats or portions thereof are identical. In some embodiments, the two HV genome terminal repeats or portions thereof are not identical.

In some embodiments, one HV genome terminal repeat or portion thereof is an HV genome long-arm terminal sequence and the other HV genome terminal repeat or portion thereof is an HV genome short-arm terminal sequence. In some embodiments, one or more of the TCRLs comprises pac1 and pac2 sites. In some embodiments, one or more of the TCRLs comprises a synthetic sequence recognized by an HV terminase. In some embodiments, the recombinant polynucleotide can be cleaved by terminase action at the one or more TCRLs. In some embodiments, cleavage of the recombinant polynucleotide by terminase action leads to the separation of the HV genome or portion thereof from the sequence comprising the origin of replication that functions in a single-celled organism. In some embodiments, one or more genes in the HV genome or portion thereof is inactivated or deleted. In some embodiments, the one or more genes in the HV genome or portion thereof is inactivated or deleted through the introduction of one or more TCRLs near or within the one or more genes. In some embodiments, the sequence comprising the origin of replication that functions in a single-celled organism further comprises a nucleic acid sequence comprising the one or more inactivated or deleted genes. In some embodiments, the one or more inactivated or deleted genes are involved in viral replication or spread. In some embodiments, the one or more inactivated or deleted genes are selected from the group consisting of glycoprotein B, glycoprotein D, glycoprotein H, glycoprotein L, IE1/2, UL51, UL52, U79, UL84, UL87, and a combination thereof.

In some embodiments, the antigen is an infectious disease antigen. In some embodiments, the infectious disease antigen is a bacterial, viral, fungal, protozoal, and/or helminthic infectious disease antigen. In some embodiments, the infectious disease antigen is a viral infectious disease antigen from simian immunodeficiency virus (SIV), human immunodeficiency virus (HIV), hepatitis C virus, herpes simplex virus, Epstein-Barr virus, or a combination thereof. In some embodiments, the infectious disease antigen comprises an HIV or SIV group-specific antigen (gag) protein. In some embodiments, the infectious disease antigen is a bacterial infectious disease antigen from Mycobacterium tuberculosis. In some embodiments, the antigen is a tumor-associated antigen. In some embodiments, the tumor-associated antigen is selected from the group consisting of prostate-specific antigen, melanoma-associated antigen 4 (MAGEA4), melanoma-associated antigen 10 (MAGEA10), NY-ESO-1, a neoantigen, and a combination thereof.

In another aspect, the present disclosure provides a recombinant polynucleotide comprising a herpesvirus (HV) genome or a substantial portion thereof, wherein the HV genome or substantial portion thereof comprises a nucleic acid sequence encoding a heterologous antigen, and wherein one or more TCRLs are introduced between or within one or more genes within the HV genome or substantial portion thereof, such that HV terminase action on the one or more introduced TCRLs leads to the inactivation or deletion of the one or more genes within the HV genome or portion thereof.

In some embodiments, the HV is a *Cytomegalovirus* (CMV), Epstein-Barr virus (EBV), herpes simplex virus (HSV), or *Rhesus* monkey rhadinovirus (RRV). In some embodiments, the one or more inactivated or deleted genes are involved in viral replication or spread. In some embodiments, the one or more inactivated or deleted genes are selected from the group consisting of glycoprotein B, glycoprotein D, glycoprotein H, glycoprotein L, IE1/2, UL51, UL52, U79, UL84, UL87, and a combination thereof. In some embodiments, the recombinant polynucleotide further comprises a sequence comprising an origin of replication that functions in a single-celled organism, wherein the HV genome or portion thereof is separated from the sequence comprising the origin of replication by a TCRL, wherein the HV genome or portion thereof abuts a TCRL at at least one extremity; and wherein the sequence comprising the origin of replication abuts a TCRL at at least one extremity.

In some embodiments, the origin of replication that functions in a single-celled organism is a BAC or YAC origin of replication. In some embodiments, the sequence comprising the origin of replication that functions in a single-celled organism further comprises a nucleic acid sequence encoding an HV replication protein. In some embodiments, the HV replication protein is selected from the group consisting of HCMV proteins UL44, UL54, UL57, UL70, UL84, UL102, UL105, IE2, UL36, UL37, UL38, UL112-113, IRS1/TRS1, a homolog thereof, and a combination thereof. In some embodiments, the sequence comprising the origin of replication further comprises a nucleic acid sequence comprising the one or more inactivated or deleted genes. In some embodiments, the HV genome or portion thereof abuts a TCRL at both extremities. In some embodiments, one or more of the TCRLs comprises two HV genome terminal repeats or portions thereof. In some embodiments, the two HV genome terminal repeats or portions thereof are identical. In some embodiments, the two HV genome terminal repeats or portions thereof are not identical.

In some embodiments, one of the HV genome terminal repeats or portion thereof is an HV genome long-arm terminal sequence and the other HV genome terminal repeat or portion thereof is an HV genome short-arm terminal sequence. In some embodiments, one or more of the TCRLs comprises pac1 and pac2 sites. In some embodiments, one or more of the TCRLs comprises a synthetic sequence recognized by an HV terminase. In some embodiments, the recombinant polynucleotide is cleaved at one or more of the TCRLs. In some embodiments, cleavage of the recombinant polynucleotide by terminase action separates the HV genome or portion thereof from the sequence comprising the origin of replication.

In some embodiments, the heterologous antigen is an infectious disease antigen. In some embodiments, the infectious disease antigen is a bacterial, viral, fungal, protozoal, and/or helminthic infectious disease antigen. In some embodiments, the infectious disease antigen is a viral infectious disease antigen from simian immunodeficiency virus (SIV), human immunodeficiency virus (HIV), hepatitis C virus, herpes simplex virus, Epstein-Barr virus, or a combination thereof. In some embodiments, the infectious disease antigen comprises an HIV or SIV group-specific antigen (gag) protein. In some embodiments, the infectious disease antigen is a bacterial infectious disease antigen from *Mycobacterium tuberculosis*. In some embodiments, the heterologous antigen is a tumor-associated antigen. In some embodiments, the tumor-associated antigen is selected from the group consisting of prostate-specific antigen, melanoma-associated antigen 4 (MAGEA4), melanoma-associated antigen 10 (MAGEA10), NY-ESO-1, a neoantigen, and a combination thereof.

In another aspect, the present disclosure provides a system comprising: (a) a recombinant polynucleotide described herein, and (b) a non-viral or viral delivery agent.

In another aspect, the present disclosure provides a system comprising: (a) a recombinant polynucleotide described herein, and (b) a viral delivery agent comprising a genome or portion thereof that contains the nucleic acid sequence of the one or more inactivated or deleted genes.

In some embodiments of any of the herein-disclosed systems, the viral delivery agent is an adenovirus (Ad).

In another aspect, the present disclosure provides a method for inducing an immune response against an antigen in a subject, the method comprising administering to the subject a therapeutically effective amount of any of the herein-described recombinant polynucleotides or systems.

In some embodiments of the method, the antigen is an infectious disease antigen. In some embodiments, the infectious disease antigen is a bacterial, viral, fungal, protozoal, and/or helminthic infectious disease antigen. In some embodiments, the antigen is a tumor-associated antigen.

In another aspect, the present disclosure provides a method for preventing or treating a disease in a subject, the method comprising inducing an immune response against an antigen in the subject according to the herein-described methods.

Numerous embodiments of the present invention, including compositions and methods for their preparation and administration, are presented herein.

BRIEF DESCRIPTION OF THE DRAWINGS

FIGS. 1A-1C. RhCMV/SIV vaccine heterogeneity. FIG. 1A: Deletions in the SIV Ag expression cassette (green) arise during serial passage of three RhCMV/SIV vaccines. FIG. 1B: Structure of a commonly arising deletion, marked with an asterisk (*). FIG. 1C: Most viruses in this passage-five RhCMV/SIV gag prep, dominated by the species in FIG. 1B, do not express Gag. Red=RhCMV, by RNAscope; Green=Flag-tagged Gag. Inset: quantitative image analysis shows 23% of RhCMV-infected cells express Gag (white arrows show double+ cells).

FIGS. 4A-4D. RhCMVdIL10/SIVgag vaccine protects wtRhCMV-negative infants with an identical transcriptomic response to vaccination. FIG. 4A: First-generation RhCMV-SIVgag vaccine is ineffective in infants. 1/12 was partially protected. FIG. 4B: Among infants receiving RhCMVdIL10-SIVgag, 3/6 are completely protected and 1/6 is partially protected. FIG. 4C: Summarized changes in inflammasome-related genes demonstrates a unique, robust response in protected animals (blue & green) vs. unprotected. FIG. 4D: Unique transcriptomic response among protected animals in TLR pathway genes.

FIG. 10A: Transfection of one microgram of CMV BAC genomic DNA using FuGene 6 leads to production of only one plaque when using conventional CMV BAC genomic DNA (TR3dIL10), but to 20 plaques when using a self-launching construct with CMV TCRLs surrounding the BAC origin (TR4dIL10) as in FIG. 2D. FIG. 10B: Using calcium phosphate-mediated transfection, comparison of plaque formation across a range of input DNA amounts. The self-launching genome with TCRLs surrounding the BAC origin is superior at every DNA-input level.

DETAILED DESCRIPTION OF THE INVENTION

1. Introduction

Figure 2:
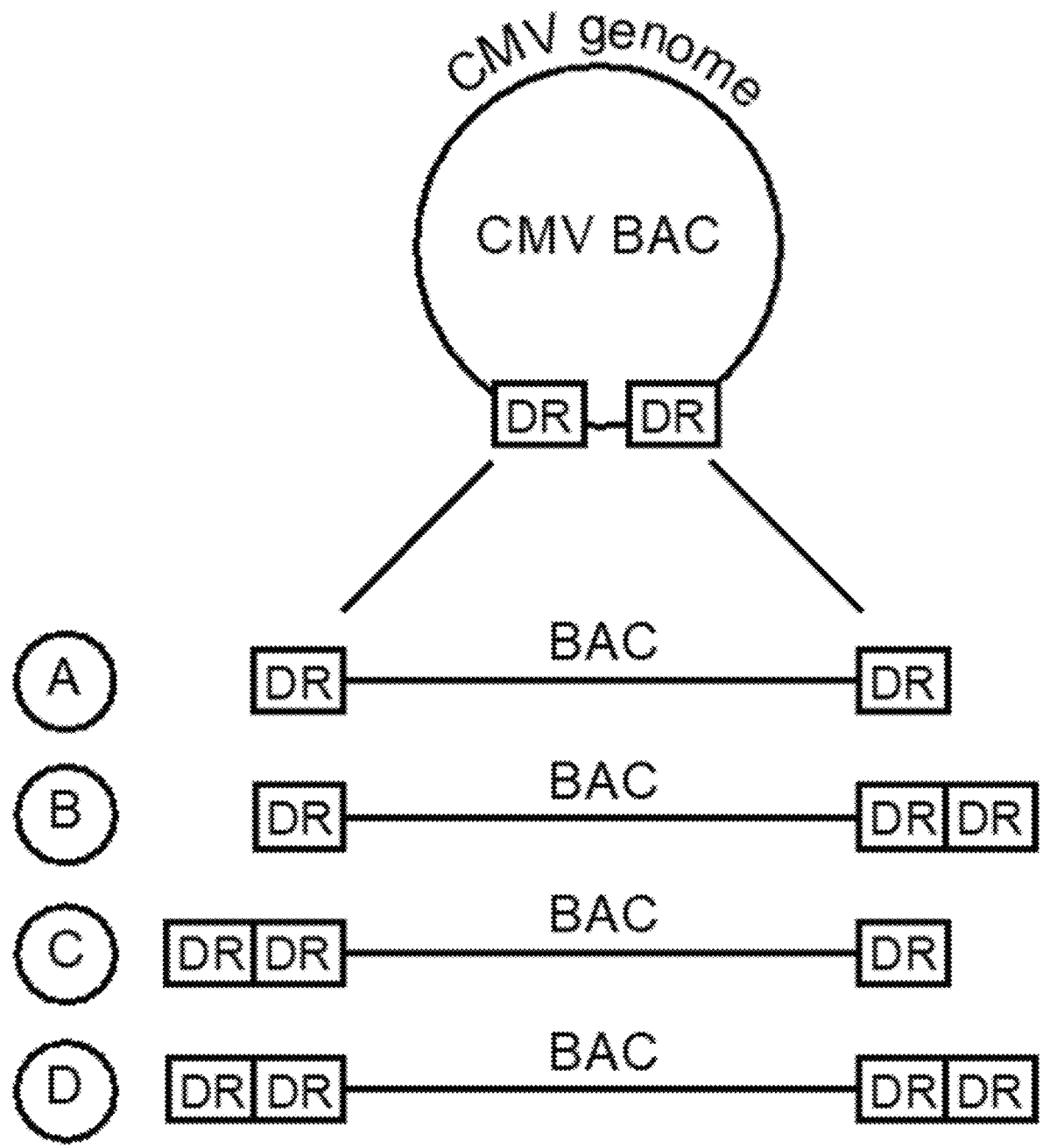
FIG. 2. Construction of BACs with alternative arrangements of terminal direct repeats (DR) for packaging exclusion. Cartoon depiction of molecular arrangements of BACs (B, C and D) that are excised from the viral genome by the viral terminase complex after replication and thus do not require an exogenous recombinase protein. Each junction between DRs contains pac1 and pac2 sites in an arrangement allowing recognition and cleavage by the viral terminase complex.

*Cytomegaloviruses* (CMV) and other herpesviruses (HV) represent a promising vaccine platform for protection of people against infectious diseases and cancer. These vaccines are based on recombinant *Cytomegalovirus* genomes that are recovered as a replicating virus in tissue culture, which is then expanded by serial passage, purified, and concentrated. The problem is that mutations can be introduced into *Cytomegalovirus*- and other HV-based vaccines during serial passage. The invention presented here solves that problem by administration of the recombinant *Cytomegalovirus* or other HV genomes themselves, in nucleic acid form, to subjects requiring vaccination.

Provision of CMV or other HV genomes in nucleic-acid rather than encapsidated form is different and provides numerous advantages. For example, vaccines to be provided in nucleic-acid form have less or no requirement for refrigeration, allowing them to be used whenever the cold chain is unavailable, e.g., in under-resourced areas. Also, nucleic acid-based CMV/HV vaccines are not vulnerable to antibodies that may be raised in the recipient against protein components of the vaccine vector. In recipients having such antibodies, therefore, the nucleic-acid form of the vaccine will have greater effect. In addition, because the precise quality of immune responses depends on route and kinetic of stimulus (perhaps because these vary the location and quantity of antigen), nucleic-acid-based CMV or other HV vaccines will stimulate qualitatively different immune responses vs. vaccines prepared as particles in tissue culture.

2. Definitions

As used herein, the following terms have the meanings ascribed to them unless specified otherwise.

A "substantial portion" of a genome indicates that a significant proportion, e.g., 20% of the overall genome and/or 20% of the genes within the genome, of the genome and the genes contained therein are retained, as opposed to, for example, a nucleic acid that only contains one or a small number of genes or elements from the genome, such as an origin of replication. In the present polynucleotides, the portions comprise at least, e.g., 20%, 30%, 40%, 50%, 60%, 70%, 80%, 90%, or more of the genome (i.e., in terms of total nucleotides) or genes present within the wild-type, full-length genome.

The terms "a," "an," or "the" as used herein not only include aspects with one member, but also include aspects with more than one member. For instance, the singular forms "a," "an," and "the" include plural referents unless the context clearly dictates otherwise. Thus, for example, reference to "a cell" includes a plurality of such cells and reference to "the agent" includes reference to one or more agents known to those skilled in the art, and so forth.

The terms "about" and "approximately" as used herein shall generally mean an acceptable degree of error for the quantity measured given the nature or precision of the measurements. Typically, exemplary degrees of error are within 20 percent (%), preferably within 10%, and more preferably within 5% of a given value or range of values. Any reference to "about X" specifically indicates at least the values X, 0.8X, 0.81X, 0.82X, 0.83X, 0.84X, 0.85X, 0.86X, 0.87X, 0.88X, 0.89X, 0.9X, 0.91X, 0.92X, 0.93X, 0.94X, 0.95X, 0.96X, 0.97X, 0.98X, 0.99X, 1.01X, 1.02X, 1.03X, 1.04X, 1.05X, 1.06X, 1.07X, 1.08X, 1.09X, 1.1X, 1.11X, 1.12X, 1.13X, 1.14X, 1.15X, 1.16X, 1.17X, 1.18X, 1.19X, and 1.2X. Thus, "about X" is intended to teach and provide written description support for a claim limitation of, e.g., "0.98X."

The term "antigen" refers to a molecule, or a portion thereof, that is capable of inducing an immune response (e.g., in a subject). While in many instances an immune response involves the production of an antibody that targets or specifically binds to the antigen, as used herein the term "antigen" also refers to molecules that induce immune responses other than those that specifically involve the production of an antibody that targets the antigen, e.g., a cell-mediated immune response involving expansion of T cells that target antigen-derived peptides presented on the surface of target cells. The antigen can originate from a foreign organism, such as a virus or microbe (e.g., bacterial organism), or can originate from a foreign tissue. Alternatively, the antigen can originate from within a subject (i.e., a subject in which the antigen induces an immune response). As a non-limiting example, an antigen can originate from a cell in a subject that has been injured, has been infected with a pathogen (e.g., a virus or microbe such as a bacterial organism), or is aberrant or damaged (e.g., a cancer cell). The term also refers to molecules that do not necessarily induce immune responses by themselves but can be made to induce an immune response when presented in the right context, and/or in combination with other molecules that facilitate immune responses.

The term "nucleic acid sequence encoding a peptide" refers to a segment of DNA, which in some embodiments may be a gene or a portion thereof, that is involved in producing a peptide chain (e.g., an antigen or a protein having IL-10-like activity). A gene will generally include regions preceding and following the coding region (leader and trailer) involved in the transcription/translation of the gene product and the regulation of the transcription/translation. A gene can also include intervening sequences (introns) between individual coding segments (exons). Leaders, trailers, and introns can include regulatory elements that are necessary during the transcription and the translation of a gene (e.g., promoters, terminators, translational regulatory sequences such as ribosome binding sites and internal ribosome entry sites, enhancers, silencers, insulators, boundary elements, replication origins, matrix attachment sites and locus control regions, etc.). A "gene product" can refer to either the mRNA or protein expressed from a particular gene.

The terms "expression" and "expressed" refer to the production of a transcriptional and/or translational product, e.g., of a nucleic acid sequence encoding a protein (e.g., an antigen or a protein having IL-10-like activity). In some embodiments, the term refers to the production of a transcriptional and/or translational product encoded by a gene (e.g., a gene encoding an antigen) or a portion thereof. The level of expression of a DNA molecule in a cell may be assessed on the basis of either the amount of corresponding mRNA that is present within the cell or the amount of protein encoded by that DNA produced by the cell.

The term "recombinant" when used with reference, e.g., to a polynucleotide, protein, vector, or cell, indicates that the polynucleotide, protein, vector, or cell has been modified by the introduction of a heterologous nucleic acid or protein or the alteration of a native nucleic acid or protein, or that the cell is derived from a cell so modified. For example, recombinant polynucleotides contain nucleic acid sequences that are not found within the native (non-recombinant) form of the polynucleotide.

The term "immune response" refers to any response that is induced (e.g., in a subject) by an antigen, including the induction of immunity against pathogens (e.g., viruses and microbes such as bacteria). Immune responses induced by systems, recombinant polynucleotides, compositions, and methods of the present invention are typically desired, intended, and/or protective immune responses. The term includes the production of antibodies against an antigen, as well as the development, maturation, differentiation, and activation of immune cells (e.g., B cells and T cells). In some instances, an immune response comprises increasing the number or activation of MHC-E-restricted $CD4^+$ and/or $CD8^+$ T cells (e.g., in a subject). The term also includes increasing or decreasing the expression or activity of cytokines that are involved in regulating immune function. As another non-limiting example, an immune response can comprise increasing the expression or activity of interferon-gamma and/or tumor necrosis factor-alpha (e.g., in a subject).

Further examples of desired, intended, and/or protective immune responses that can be induced according to recombinant polynucleotides, compositions, and methods of the present invention include, but are not limited to, those involving class Ia-, class Ib-, or class II-restricted $CD4^+$ T cells; class Ia-, class Ib-, or class II-restricted $CD8^+$ T cells; cytokine-producing T cells (e.g., T cells that produce IFN-gamma, TNF-alpha, IL-1-beta, IL-2, IL-4, IL-5, IL-10, IL-13, IL-17, IL-18, or IL-23); $CCR7^-$ $CD8^+$ T cells (e.g., effector-memory cells); $CXCR5^+$ T cells (i.e., those homing to B cell follicles); $CD4^+$ regulatory T cells; $CD8^+$ regulatory T cells; antigen-specific T follicular helper cells; antibody production; NK cells; $NKG2C^+$ NK cells; $CD57^+$ NK cells; FcR-gamma-negative NK cells; and NK-CTL cells, i.e., $CD8^-$ T cells expressing molecules typical of NK cells, such as NKG2A.

The term "*Cytomegalovirus*" or "CMV" refers to viruses that include members of the *Cytomegalovirus* genus of viruses (within the order Herpesvirales, family Herpesviridae, subfamily Betaherpesvirinae). The term includes, but is not limited to, *Human cytomegalovirus* (HCMV; also known as Human herpesvirus 5 (HHV-5)), *Simian cytomegalovirus* (SCCMV or AGMCMV), *Baboon cytomegalovirus* (BaCMV), *Owl monkey cytomegalovirus* (OMCMV), *Squirrel monkey cytomegalovirus* (SMCMV), and *Rhesus cytomegalovirus* (RhCMV) that infects macaques.

The term "antigen-presenting cell" or "APC" refers to a cell that displays or presents an antigen, or a portion thereof, on the surface of the cell. Typically, antigens are displayed or presented with a major histocompatibility complex (MHC) molecule. Almost all cell types can serve as APCs, and APCs are found in a large number of different tissue types. Professional APCs, such as dendritic cells, macrophages, and B cells, present antigens to T cells in a context that most efficiently leads to their activation and subsequent proliferation. Many cell types present antigens to cytotoxic T cells.

The term "infectious disease" refers to any disease or disorder caused by an organism (e.g., viruses, bacteria, fungi, protozoa, helminths, and parasitic organisms). The term includes diseases and disorders that are transmitted from one subject to another (e.g., human to human, non-human animal to human, and human to non-human animal), as well as those caused by ingesting contaminated food or water or by exposure to pathogenic organisms (e.g., in the environment).

An "infectious disease antigen" refers to any molecule originating from an infectious disease-causing organism that can induce an immune response (e.g., in a subject). For example, an infectious disease antigen can originate from a virus, bacterium, fungus, protozoan, helminth, or parasite, and can be, for example, a bacterial wall protein, a viral capsid or structural protein (e.g., a retroviral group-specific antigen (gag) protein, such as an HIV or SIV gag protein), or a portion thereof. In some embodiments, the infectious disease antigen is a bacterial infectious disease antigen from *Mycobacterium tuberculosis*.

The term "cancer" refers to any of various malignant neoplasms characterized by the proliferation of anaplastic cells that tend to invade surrounding tissue and metastasize to new body sites. Non-limiting examples of different types of cancer suitable for treatment using the methods and compositions of the present invention include colorectal cancer, colon cancer, anal cancer, liver cancer, ovarian cancer, breast cancer, lung cancer, bladder cancer, thyroid cancer, pleural cancer, pancreatic cancer, cervical cancer, prostate cancer, testicular cancer, bile duct cancer, gastrointestinal carcinoid tumors, esophageal cancer, gall bladder cancer, rectal cancer, appendix cancer, small intestine cancer, stomach (gastric) cancer, renal cancer (e.g., renal cell carcinoma), cancer of the central nervous system, skin cancer, oral squamous cell carcinoma, choriocarcinomas, head and neck cancers, bone cancer, osteogenic sarcomas, fibrosarcoma, neuroblastoma, glioma, melanoma, leukemia (e.g., acute lymphocytic leukemia, chronic lymphocytic leukemia, acute myelogenous leukemia, chronic myelogenous leukemia, or hairy cell leukemia), lymphoma (e.g., non-Hodgkin's lymphoma, Hodgkin's lymphoma, B-cell lymphoma, or Burkitt's lymphoma), and multiple myeloma.

The term "tumor-associated antigen" or "TAA" refers to any antigen that is produced by a tumor cell (i.e., any protein or molecule produced by a tumor cell that can induce an immune response, e.g., in a subject). TAAs include, but are not limited to, products of mutated oncogenes and mutated tumor suppressor genes, overexpressed or aberrantly expressed cellular proteins, antigens that are produced by oncogenic viruses, oncofetal antigens, altered cell surface glycolipids and glycoproteins, and antigens that are cell type-specific. In some embodiments, the TAA is one that newly arises in a tumor (e.g., in a subject's tumor).

As used herein, the terms "polynucleotide," "nucleic acid," and "nucleotide," refer to deoxyribonucleic acids (DNA) or ribonucleic acids (RNA) and polymers thereof. The term includes, but is not limited to, single-, double-, or multi-stranded DNA or RNA, genomic DNA, cDNA, and DNA-RNA hybrids, as well as other polymers comprising purine and/or pyrimidine bases or other natural, chemically modified, biochemically modified, non-natural, synthetic, or derivatized nucleotide bases. Unless specifically limited, the term encompasses nucleic acids containing known analogs of natural nucleotides that have similar binding properties as the reference nucleic acid. Unless otherwise indicated, a particular nucleic acid sequence also implicitly encompasses conservatively modified variants thereof (e.g., degenerate codon substitutions), homologs, and complementary sequences as well as the sequence explicitly indicated. Specifically, degenerate codon substitutions may be achieved by generating sequences in which the third position of one or more selected (or all) codons is substituted with mixed-base and/or deoxyinosine residues (Batzer et al., *Nucleic Acid Res.* 19:5081 (1991); Ohtsuka et al., *J. Biol. Chem.* 260:2605-2608 (1985); and Rossolini et al., *Mol. Cell. Probes* 8:91-98 (1994)).

The terms "vector" and "expression vector" refer to a nucleic acid construct, generated recombinantly or synthetically, with a series of specified nucleic acid elements that permit transcription of a particular nucleic acid sequence (e.g., encoding an antigen and/or a protein having IL-10-like activity) in a host cell or engineered cell. In some embodiments, a vector includes a polynucleotide to be transcribed, operably linked to a promoter. Other elements that may be present in a vector include those that enhance transcription (e.g., enhancers), those that terminate transcription (e.g., terminators), those that confer certain binding affinity or antigenicity to a protein (e.g., recombinant protein) produced from the vector, and those that enable replication of the vector and its packaging (e.g., into a viral particle). In some embodiments, the vector is a viral vector (i.e., a viral genome or a portion thereof). A vector may contain nucleic acid sequences or mutations, for example, that increase tropism and/or modulate immune function.

The terms "polypeptide," "peptide," and "protein" are used interchangeably herein to refer to a polymer of amino acid residues. All three terms apply to amino acid polymers in which one or more amino acid residues are an artificial chemical mimetic of a corresponding naturally occurring amino acid, as well as to naturally occurring amino acid polymers and non-naturally occurring amino acid polymers. As used herein, the terms encompass amino acid chains of any length, including full-length proteins, wherein the amino acid residues are linked by covalent peptide bonds.

The terms "subject," "individual," and "patient" are used interchangeably herein to refer to a vertebrate, preferably a mammal, more preferably a human. Mammals include, but are not limited to, murines, mice, rats, simians, humans, farm animals, sport animals, and pets. Tissues, cells and their progeny of a biological entity obtained in vivo or cultured in vitro are also encompassed.

As used herein, the term "administering" includes oral administration, topical contact, administration as a suppository, intravenous, intraperitoneal, intramuscular, intralesional, intratumoral, intrathecal, intranasal, intraosseous, or subcutaneous administration to a subject. Administration is by any route, including parenteral and transmucosal (e.g., buccal, sublingual, palatal, gingival, nasal, vaginal, rectal, or transdermal). Parenteral administration includes, e.g., intravenous, intramuscular, intra-arterial, intradermal, subcutaneous, intraperitoneal, intraventricular, intraosseous, and intracranial. Other modes of delivery include, but are not limited to, the use of liposomal formulations, intravenous infusion, transdermal patches, etc.

The term "treating" refers to an approach for obtaining beneficial or desired results including, but not limited to, a therapeutic benefit and/or a prophylactic benefit. "Therapeutic benefit" means any therapeutically relevant improvement in or effect on one or more diseases, conditions, or symptoms under treatment. Therapeutic benefit can also mean to effect a cure of one or more diseases, conditions, or symptoms under treatment. Furthermore, therapeutic benefit can also mean to increase survival. For prophylactic benefit, the compositions may be administered to a subject at risk of developing a particular disease, condition, or symptom, or to a subject reporting one or more of the physiological symptoms of a disease, even though the disease, condition, or symptom may not yet be present.

The term "therapeutically effective amount" or "sufficient amount" refers to the amount of a system, recombinant polynucleotide, or composition described herein that is sufficient to effect beneficial or desired results. The therapeutically effective amount may vary depending upon one or more of: the subject and disease condition being treated, the weight and age of the subject, the severity of the disease condition, the immune status of the subject, the manner of administration and the like, which can readily be determined by one of ordinary skill in the art. The specific amount may vary depending on one or more of: the particular agent chosen, the target cell type, the location of the target cell in the subject, the dosing regimen to be followed, whether it is administered in combination with other compounds, timing of administration, and the physical delivery system in which it is carried.

For the purposes herein an effective amount is determined by such considerations as may be known in the art. The amount must be effective to achieve the desired therapeutic effect in a subject suffering from a disease such as an infectious disease or cancer. The desired therapeutic effect may include, for example, amelioration of undesired symptoms associated with the disease, prevention of the manifestation of such symptoms before they occur, slowing down the progression of symptoms associated with the disease, slowing down or limiting any irreversible damage caused by the disease, lessening the severity of or curing the disease, or improving the survival rate or providing more rapid recovery from the disease. Further, in the context of prophylactic treatment the amount may also be effective to prevent the development of the disease.

The term "pharmaceutically acceptable carrier" refers to a substance that aids the administration of an active agent to a cell, an organism, or a subject. "Pharmaceutically acceptable carrier" also refers to a carrier or excipient that can be included in the compositions of the invention and that causes no significant adverse toxicological effect on the patient. Non-limiting examples of pharmaceutically acceptable carriers include water, sodium chloride (NaCl), normal saline solutions, lactated Ringer's, normal sucrose, normal glucose, binders, fillers, disintegrants, lubricants, coatings, sweeteners, flavors and colors, liposomes, dispersion media, microcapsules, cationic lipid carriers, isotonic and absorption delaying agents, and the like. The carrier may also comprise or consist of substances for providing the formulation with stability, sterility and isotonicity (e.g. antimicrobial preservatives, antioxidants, chelating agents and buffers), for preventing the action of microorganisms (e.g. antimicrobial and antifungal agents, such as parabens, chlorobutanol, phenol, sorbic acid and the like) or for providing the formulation with an edible flavor, etc. In some instances, the carrier is an agent that facilitates the delivery of a polypeptide, fusion protein, or polynucleotide to a target cell or tissue. One of skill in the art will recognize that other pharmaceutical carriers are useful in the present invention.

The term "vaccine" refers to a biological composition that, when administered to a subject, has the ability to produce an acquired immunity to a particular pathogen or disease in the subject. Typically, one or more antigens, fragments of antigens, or polynucleotides encoding antigens or fragments of antigens that are associated with the pathogen or disease of interest are administered to the subject. Vaccines can comprise, for example, inactivated or attenuated organisms (e.g., bacteria or viruses), cells, proteins that are expressed from or on cells (e.g., cell surface or other proteins produced by cells (e.g., tumor cells)), proteins that are produced by organisms (e.g., toxins), or portions of organisms (e.g., viral envelope proteins or viral genes encoding various antigens). In some instances, cells are engineered to express proteins such that, when administered as a vaccine, they enhance the ability of a subject to acquire immunity to a particular cell type (e.g., enhance the ability of a subject to acquire immunity to a cancer cell) or to an organism that causes an infectious disease such as a virus, a bacterium, a fungal organism, a protozoan, or a helminth. As used herein, the term "vaccine" includes, but is not limited to, systems and recombinant polynucleotides of the present invention, as well as viral particles, host cells, and pharmaceutical compositions that comprise systems or recombinant polynucleotides of the present invention.

The term "group-specific antigen" or "gag" refers to a protein encoded by a retroviral gag gene. Gag genes encode the core structural proteins of retroviruses. In human immunodeficiency virus (HIV), the gag gene encodes a gag polyprotein precursor (Pr55$^{Gag}$), which is subsequently proteolytically processed into the p17 matrix protein (MA), the p24 capsid protein (CA), the p7 nucleocapsid protein (NC), the SP1 and SP2 spacer peptides, and the p6 polypeptide that is located at the N-terminus of the gag polyprotein. In the closely related simian immunodeficiency viruses (SIV), the gag gene similarly encodes a gag polyprotein precursor, which is subsequently proteolytically processed into proteins having similar molecular weights to their HIV equivalents. Non-limiting examples of HIV and SIV gag protein sequences are set forth under UniProt reference numbers P04591 and P89153, respectively.

3. Vectors

The present vectors can comprise any of a number of elements that allow them to, inter alia, induce an immune reaction in a patient to an antigen present within an HV genome or substantial portion thereof (i.e., an endogenous antigen) or to a heterologous antigen encoded by a polynucleotide introduced into the HV genome or substantial portion thereof; that allow growth of the vector in single-celled organisms, e.g., through the inclusion of a BAC or YAC origin of replication, thereby allowing their production and amplification in a highly stable manner; and that allow their delivery in nucleic acid form to individuals, where upon their introduction into cells the presence of one or more TCRL elements can direct the cleavage of the vector to, e.g., separate the HV genome-containing part of the vector from the part containing a BAC or YAC origin of replication, or, e.g., to inactivate one or more genes within the HV genome or substantial portion thereof.

In one embodiment, therefore, the disclosure provides recombinant polynucleotides including (a) a herpesvirus (HV) genome or a substantial portion thereof; (b) a sequence comprising an origin of replication that functions in a single-celled organism; (c) one or more terminase complex recognition loci (TCRL) comprising a recombinantly introduced polynucleotide sequence that can direct cleavage by an HV terminase complex; wherein the HV genome or portion thereof is separated from the sequence comprising an origin of replication by a TCRL; wherein the HV genome or portion thereof abuts a TCRL at at least one extremity; and wherein the sequence comprising the origin of replication abuts a TCRL at at least one extremity.

As used herein, the "extremity" of a specific genomic region or element in a vector, such as an genome or a portion thereof, refers to either end of the region or element, beyond which another region or element (or the end of the nucleic acid molecule) is present. For example, in a circular vector, in some embodiments, one end (or extremity) of the HV genome can be directly adjacent to a first end of a first TCRL element, and the other end (or extremity) of the HV genome can be directly adjacent to a first end of a second TCRL element. In the same circular vector, one end (or extremity) of the origin-containing region can be directly adjacent to a second end of the first TCRL element, and the other end (or extremity) of the origin-containing region can be directly adjacent to a second end of the second TCRL element.

It will be appreciated that the polynucleotides can be circular or linear, and that additional elements can be present between the HV genome or substantial portion thereof and the sequence comprising a BAC or YAC origin of replication, e.g., genetic elements present between a TCRL abutting the HV genome or substantial portion thereof and the (BAC or YAC) origin of replication that functions in a single-celled organism.

In some embodiments, a recombinant polynucleotide of the present invention contains a nucleic acid sequence that encodes a selectable marker. A selectable marker is useful, for example, when a polynucleotide of the present invention is being recombinantly modified, especially when it is desirable to screen a population of modified polynucleotides (e.g., using bacterial, yeast, plant, or animal cells) for those that have incorporated the desired modification(s). Whether the polynucleotide is recombinantly modified within a cell (e.g., a bacterial cell, for example, using Red/ET recombination) or is recombinantly modified and subsequently introduced into a cell (e.g., bacterial, yeast, plant, or animal cell) for screening, the selectable marker can be used to identify which cells contain polynucleotides that have incorporated a modification of interest. Taking antibiotic resistance genes as an example of a selectable marker, treating the cells that contain the recombinant polynucleotides with the antibiotic will identify which cells contain recombinant polynucleotides that have incorporated the antibiotic resistance gene (i.e., the cells that survive after antibiotic treatment must have incorporated the antibiotic resistance gene). If desired, the recombinant polynucleotides can be further screened (e.g., purified from the cells, amplified, and sequenced), in order to verify that the desired modification has been recombinantly introduced into the polynucleotide at the correct position.

When the selectable marker is an antibiotic resistance gene, the gene can confer resistance to Zeocin, ampicillin, tetracycline, or another appropriate antibiotic that will be known to one of skill in the art. In some embodiments, a selectable marker is used that produces a visible phenotype, such as the color of an organism or population of organisms. As a non-limiting example, the phenotype can be examined by growing the organisms (e.g., cells or other organisms that contain the recombinant polynucleotide) and/or their progeny under conditions that result in a phenotype, wherein the phenotype may not be visible under ordinary growth conditions.

In some embodiments, the selectable marker used for identifying cells that contain a polynucleotide containing a modification of interest is a fluorescently tagged protein, a chemical stain, a chemical indicator, or a combination thereof. In other embodiments, the selectable marker responds to a stimulus, a biochemical, or a change in environmental conditions. In some instances, the selectable marker responds to the concentration of a metabolic product, a protein product, a drug, a cellular phenotype of interest, a cellular product of interest, or a combination thereof.

The size of a recombinant polynucleotide of the present invention will depend on the particular antigen(s) and other proteins that are being encoded, the presence and choice of regulatory sequences and/or expression vectors (e.g., viral vectors), the choice and position of different TCRLs, the possible presence of inactivated or deleted genes within the BAC or YAC portion of the polynucleotide, etc. Additionally, the size of a recombinant polynucleotide will depend on whether the nucleic acid sequences encoding the antigen and other proteins are present within the same recombinant polynucleotide or separate recombinant polynucleotides.

In some embodiments, a recombinant polynucleotide is between about 1 kilobase and about 300 kilobases (e.g., about 1, 1.1, 1.2, 1.3, 1.4, 1.5, 1.6, 1.7. 1.8, 1.9, 2, 3, 4, 5, 6, 7, 8, 9, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or 300 kilobases) in length. In some embodiments, the recombinant polynucleotide is greater than about 300 kilobases in length.

In some embodiments, a recombinant polynucleotide present in a system of the present invention is about 1 kilobase to about 300 kilobases, about 1 kilobase to about 250 kilobases, about 1 kilobase to about 200 kilobases, about 1 kilobase to about 150 kilobases, about 1 kilobase to about 100 kilobases, about 1 kilobase to about 50 kilobases, about 1 kilobase to about 40 kilobases, about 1 kilobase to about 30 kilobases, about 1 kilobase to about 20 kilobases, about 1 kilobase to about 10 kilobases, about 50 kilobases to about 300 kilobases, about 50 kilobases to about 250 kilobases, about 50 kilobases to about 200 kilobases, about 50 kilobases to about 150 kilobases, about 50 kilobases to about 100 kilobases, about 100 kilobases to about 300 kilobases, about 100 kilobases to about 250 kilobases, about 100 kilobases to about 200 kilobases, about 100 kilobases to about 150 kilobases, about 150 kilobases to about 300 kilobases, about 150 kilobases to about 250 kilobases, about 150 kilobases to about 200 kilobases, about 200 kilobases to about 300 kilobases, or about 200 kilobases to about 250 kilobases in length.

General Recombinant Technology

Basic texts disclosing general methods and techniques in the field of recombinant genetics include Sambrook and Russell, *Molecular Cloning, A Laboratory Manual* (3rd ed. 2001); Kriegler, *Gene Transfer and Expression: A Laboratory Manual* (1990); and Ausubel et al., eds., *Current Protocols in Molecular Biology* (1994).

For nucleic acids, sizes are given in either kilobases (kb) or base pairs (bp). In some instances, these are estimates derived from agarose or acrylamide gel electrophoresis, from sequenced nucleic acids, or from published DNA sequences. For proteins, sizes are given in kilodaltons (kDa) or amino acid residue numbers. In some instances, protein sizes are estimated from gel electrophoresis, from sequenced proteins, from derived amino acid sequences, or from published protein sequences.

Oligonucleotides that are not commercially available can be chemically synthesized, e.g., according to the solid phase phosphoramidite triester method first described by Beaucage & Caruthers, *Tetrahedron Lett.* 22: 1859-1862 (1981), using an automated synthesizer, as described in Van Devanter et. al., *Nucleic Acids Res.* 12: 6159-6168 (1984). Purification of oligonucleotides is performed using any art-recognized strategy, e.g., native acrylamide gel electrophoresis or anion-exchange HPLC as described in Pearson & Reanier, *J. Chrom.* 255: 137-149 (1983).

The sequence of a protein domain or gene of interest can be verified after cloning or subcloning using, e.g., the chain termination method for sequencing double-stranded templates of Wallace et al., *Gene* 16: 21-26 (1981).

Coding Sequence for a Protein of Interest

The present invention provides recombinant polynucleotides (e.g., isolated recombinant polynucleotides) that comprise nucleic acid sequences encoding antigens. Rapid progress in the studies of various genomes (e.g., the human genome) has made possible a cloning approach where a human or other model organism DNA sequence database can be searched for any gene segment that has a certain percentage of sequence homology to a known nucleotide sequence, such as one encoding an antigen, etc. Any DNA sequence so identified can be subsequently obtained by chemical synthesis and/or a polymerase chain reaction (PCR) technique such as the overlap extension method. For a short sequence, completely de novo synthesis may be sufficient; whereas further isolation of full length coding sequence from a human or other model organism cDNA or genomic library using a synthetic probe may be necessary to obtain a larger gene.

Alternatively, a nucleic acid sequence can be isolated from a cDNA or genomic DNA library (e.g., human or rodent cDNA or human, rodent, bacterial, or viral genomic DNA library) using standard cloning techniques such as polymerase chain reaction (PCR), where homology-based primers can often be derived from a known nucleic acid sequence. Commonly used techniques for this purpose are described in standard texts, e.g., Sambrook and Russell, supra.

cDNA libraries may be commercially available or can be constructed. The general methods of isolating mRNA, making cDNA by reverse transcription, ligating cDNA into a recombinant vector, transfecting into a recombinant host for propagation, screening, and cloning are well known (see, e.g., Gubler and Hoffman, *Gene*, 25: 263-269 (1983); Ausubel et al., supra). Upon obtaining an amplified segment of nucleotide sequence by PCR, the segment can be further used as a probe to isolate the full-length polynucleotide sequence encoding the protein of interest from the cDNA library. A general description of appropriate procedures can be found in Sambrook and Russell, supra.

A similar procedure can be followed to obtain a full-length sequence encoding a protein of interest from a human or other model organism genomic library. Genomic libraries are commercially available or can be constructed according to various art-recognized methods. As a non-limiting example, to construct a genomic library, the DNA is first extracted from a tissue of the organism. The DNA is then either mechanically sheared or enzymatically digested to yield fragments of about 12-20 kb in length. The fragments are subsequently separated by gradient centrifugation from polynucleotide fragments of undesired sizes and are inserted in bacteriophage λ vectors. These vectors and phages are packaged in vitro. Recombinant phages are analyzed by plaque hybridization as described in Benton and Davis, *Science*, 196: 180-182 (1977). Colony hybridization is carried out as described by Grunstein et al., *Proc. Natl. Acad. Sci. USA*, 72: 3961-3965 (1975).

Based on sequence homology, degenerate oligonucleotides can be designed as primer sets and PCR can be performed under suitable conditions (see, e.g., White et al., *PCR Protocols: Current Methods and Applications*, 1993; Griffin and Griffin, *PCR Technology*, CRC Press Inc. 1994) to amplify a segment of nucleotide sequence from a cDNA or genomic library. Using the amplified segment as a probe, the full-length nucleic acid encoding a protein of interest is obtained.

Upon acquiring a nucleic acid sequence encoding a protein of interest, the coding sequence can be further modified by a number of well-known techniques such as restriction endonuclease digestion, PCR, and PCR-related methods to generate coding sequences, including mutants and variants derived from the wild-type protein. The polynucleotide sequence encoding the desired polypeptide can then be subcloned into a vector, for instance, an expression vector, so that a recombinant polypeptide can be produced from the resulting construct. Further modifications to the coding sequence, e.g., nucleotide substitutions, may be subsequently made to alter the characteristics of the polypeptide.

A variety of mutation-generating protocols are established and described in the art, and can be readily used to modify a polynucleotide sequence encoding a protein of interest. See, e.g., Zhang et al., *Proc. Natl. Acad. Sci. USA*, 94: 4504-4509 (1997); and Stemmer, *Nature*, 370: 389-391 (1994). The procedures can be used separately or in combination to produce variants of a set of nucleic acids, and hence variants of encoded polypeptides. Kits for mutagenesis, library construction, and other diversity-generating methods are commercially available.

Mutational methods of generating diversity include, for example, site-directed mutagenesis (Botstein and Shortle, *Science*, 229: 1193-1201 (1985)), mutagenesis using uracil-containing templates (Kunkel, *Proc. Natl. Acad. Sci. USA*, 82: 488-492 (1985)), oligonucleotide-directed mutagenesis (Zoller and Smith, *Nucl. Acids Res.*, 10: 6487-6500 (1982)), phosphorothioate-modified DNA mutagenesis (Taylor et al., *Nucl. Acids Res.*, 13: 8749-8787 (1985)), and mutagenesis using gapped duplex DNA (Kramer et al., *Nucl. Acids Res.*, 12: 9441-9456 (1984)).

Other possible methods for generating mutations include point mismatch repair (Kramer et al., *Cell*, 38: 879-887 (1984)), mutagenesis using repair-deficient host strains (Carter et al., *Nucl. Acids Res.*, 13: 4431-4443 (1985)), deletion mutagenesis (Eghtedarzadeh and Henikoff, *Nucl. Acids Res.*, 14: 5115 (1986)), restriction-selection and restriction-purification (Wells et al., *Phil. Trans. R. Soc.*

Lond. A, 317: 415-423 (1986)), mutagenesis by total gene synthesis (Nambiar et al., *Science,* 223: 1299-1301 (1984)), double-strand break repair (Mandecki, *Proc. Natl. Acad. Sci. USA,* 83: 7177-7181 (1986)), mutagenesis by polynucleotide chain termination methods (U.S. Pat. No. 5,965,408), and error-prone PCR (Leung et al., *Biotechniques,* 1: 11-15 (1989)).

In some embodiments, a nucleic acid sequence encoding a protein of interest (e.g., an antigen or other protein) is codon optimized. The term "codon optimization" refers to altering a nucleic acid sequence, without changing the encoded amino acid sequence, in such a way that codon bias (i.e., the preferential use of particular codons that can vary between species) is reduced or rebalanced. In some embodiments, codon optimization increases translational efficiency (e.g., of an antigen or other protein). As a non-limiting example, leucine is encoded by six different codons, some of which are rarely used. By rebalancing codon usage (e.g., within a reading frame), preferred leucine codons can be selected over rarely used codons. The nucleic acid sequence encoding the protein (e.g., antigen or other protein) of interest is altered such that the rarely used codons are converted to preferred codons.

Rare codons can be defined, for example, by using a codon usage table derived from the sequenced genome of a host species, i.e., the species in which the protein (e.g., an antigen) will be expressed. See, e.g., the codon usage table obtained from Kazusa DNA Research Institute, Japan (www.kazusa.or.jp/codon/) used in conjunction with software, e.g., "Gene Designer 2.0" software, from DNA 2.0 (www.dna20.com/) at a cut-off threshold of 15%.

Codon optimization may also be employed to modulate GC content, e.g., to increase mRNA stability or reduce secondary structure; or otherwise minimize codons that may result in stretches of sequence that impair expression of the protein of interest (e.g., an antigen or other protein).

4. Methods for Inducing an Immune Response and Treating Disease

In another aspect, pharmaceutical compositions are provided herein. In some embodiments, the pharmaceutical composition comprises: (a) a recombinant polynucleotide of the present invention; and (b) a pharmaceutically acceptable carrier.

In another aspect, methods for inducing an immune response against an antigen (e.g., in a subject) are provided herein. In some embodiments, the method comprises administering a polynucleotide of the invention (e.g., a therapeutically effective amount thereof) to a subject (e.g., a subject in need thereof). In some embodiments, the method comprises administering a pharmaceutical composition (e.g., a therapeutically effective amount thereof) of the present invention to a subject.

The antigen against which an immune response is generated (e.g., in a subject) will depend on the particular disease (s) for which prophylactic and/or therapeutic benefit is sought. In some embodiments, the antigen is an infectious disease antigen. In other embodiments, the antigen is a tumor-associated antigen. In some embodiments, the antigen is both an infectious disease and a tumor-associated antigen. In particular embodiments, inducing an immune response against an infectious disease antigen prevents or treats another disease that is caused or exacerbated by the infectious disease. As a non-limiting example, inducing an immune response against an infectious disease antigen can prevent and/or treat a cancer that is caused or exacerbated by the particular infectious disease associated with that antigen. As another non-limiting example, inducing an immune response against an infectious disease that causes immunodeficiency (e.g., in a subject), such as HIV or SIV, can prevent and/or treat diseases that result from the immunodeficiency.

In some embodiments, an immune response (e.g., a desired, intended, or protective immune response, e.g., in a subject) is induced against a bacterial antigen (e.g., a bacterial infectious disease antigen). In some embodiments, an immune response is induced against a viral antigen (e.g., a viral infectious disease antigen). In some embodiments, an immune response is induced against a fungal antigen (e.g., a fungal infectious disease antigen). In some embodiments, an immune response is induced against a protozoal antigen (e.g., a protozoal infectious disease antigen). In some embodiments, an immune response is induced against a helminthic antigen (e.g., a helminthic infectious disease antigen). In some embodiments, the antigen is a bacterial, viral, fungal, protozoal, and/or helminthic antigen. In particular embodiments, the antigen is derived from a parasite.

In some instances, the antigen (e.g., infectious disease antigen) is from simian immunodeficiency virus (SIV), human immunodeficiency virus (HIV), hepatitis C virus, herpes simplex virus 1, herpes simplex virus 2, varicella-zoster virus, *Human cytomegalovirus,* human herpesvirus 6A, human herpesvirus 6B, human herpesvirus 7, human herpesvirus 8, Epstein-Barr virus, a hemorrhagic fever virus, *Mycobacterium tuberculosis*, or a combination thereof. Non-limiting examples of suitable infectious disease antigens include SIV and HIV gag proteins.

Compositions and methods of the present invention are useful for inducing a response (e.g., a desired, intended, or protective immune response) against any number of tumor-associated antigens (TAAs). The TAA can be derived from, for example, a colorectal cancer cell, a colon cancer cell, an anal cancer cell, a liver cancer cell, an ovarian cancer cell, a breast cancer cell, a lung cancer cell, a bladder cancer cell, a thyroid cancer cell, a pleural cancer cell, a pancreatic cancer cell, a cervical cancer cell, a prostate cancer cell, a testicular cancer cell, a bile duct cancer cell, a gastrointestinal carcinoid tumor cell, an esophageal cancer cell, a gall bladder cancer cell, a rectal cancer cell, an appendix cancer cell, a small intestine cancer cell, a stomach (gastric) cancer cell, a renal cancer (e.g., renal cell carcinoma) cell, a central nervous system cancer cell, a skin cancer cell, an oral squamous cell carcinoma cell, a choriocarcinoma cell, a head and neck cancer cell, a bone cancer cell, an osteogenic sarcoma cell, a fibrosarcoma cell, a neuroblastoma cell, a glioma cell, a melanoma cell, a leukemia (e.g., acute lymphocytic leukemia, chronic lymphocytic leukemia, acute myelogenous leukemia, chronic myelogenous leukemia, or hairy cell leukemia) cell, a lymphoma (e.g., non-Hodgkin's lymphoma, Hodgkin's lymphoma, B-cell lymphoma, or Burkitt's lymphoma) cell, a multiple myeloma cell, or any combination thereof. In particular embodiments, the TAA is derived from an ovarian cancer cell, a melanoma cell, a prostate cancer cell, or a combination thereof.

Non-limiting examples of TAAs to which an immune response (e.g., a desired, intended, or protective immune response) can be induced (e.g., using compositions and methods of the present invention) include the melanoma-associated antigens (MAGEs). MAGE proteins contain a conserved domain that is about 200 amino acids in length and is usually located near the C-terminal end of the protein, although the conserved domain is located closer to the central portion of some MAGE proteins. Human MAGE proteins include MAGEA1, MAGEA2, MAGEA2B, MAGEA3, MAGEA4, MAGEA5, MAGEA6, MAGEA7P, MAGEA8, MAGEA9, MAGEA9B, MAGEA10, MAGEA11, MAGEA12, MAGEA13P, MAGEB1, MAGEB2, MAGEB3, MAGEB4, MAGEB5, MAGEB6, MAGEB10, MAGEB16, MAGEB17, MAGEB18, MAGEC1, MAGEC2, MAGEC3, MAGED1, MAGED2, MAGED3 (also known as "trophin" or "TRO"), MAGED4, MAGED4B, MAGEE1, MAGEE2, MAGEF1, MAGEEG1 (also known as "NSMCE3"), MAGEH1, MAGEL2, and NDN. Additional non-limiting examples of TAAs that are useful for the present invention include NY-ESO-1 and prostate-specific antigen (PSA).

In some embodiments, an immune response (e.g., a desired, intended, or protective immune response) is induced against an antigen selected from the group consisting of MAGEA4, MAGEA10, NY-ESO-1, PSA, and a combination thereof.

In some embodiments, a TAA is one that newly arises in a tumor (e.g., a subject's tumor). Such neoantigens can arise, for example, as a consequence of a tumor-specific mutation. In some embodiments, a TAA is a cell surface protein (e.g., that is normally present on the surface of a cell), or a portion thereof, that is altered as a consequence of a mutation in a gene encoding the cell surface protein.

In some embodiments, the immune response (e.g., a desired, intended, or protective immune response) that is induced (e.g., in a subject) using a recombinant polynucleotide or pharmaceutical composition of the present invention is greater than the immune response that is induced using a recombinant polynucleotide or pharmaceutical composition that does not express the antigen in a subject. In some embodiments, the desired, intended, or protective immune response is equivalent or reduced but an undesirable or unintended response is less than the response that is induced using recombinant polynucleotide or pharmaceutical composition that does not express the antigen. In some embodiments, systems, compositions, and methods of the present invention generate a collection of immune responses that is more therapeutically effective due to reduction in undesirable and/or unintended immune responses.

In some embodiments, inducing an immune response (e.g., desired, intended, or protective immune response, e.g., in a subject) comprises generating antibodies that recognize an antigen (e.g., an antigen encoded by a recombinant polynucleotide present as part of a system of the present invention). In some instances, antibodies are generated that recognize an infectious disease antigen. In some instances, antibodies are generated that recognize a TAA. In some instances, antibodies are generated that recognize an infectious disease antigen and/or a TAA.

In some embodiments, inducing an immune response comprises increasing the expression and/or activity of an immunostimulatory protein (e.g., in a subject). In some embodiments, inducing an immune response comprises increasing the expression and/or activity of a cytokine (e.g., MIP-1alpha, MIP-1beta). In some instances, inducing an immune response comprises increasing the expression and/or activity of an interleukin (e.g., IL-1beta, IL-4, IL-6, IL-8, IL-10, IL-13, IL-17, IL-21) and/or TNF-alpha.

In some embodiments, inducing an immune response comprises increasing the number and/or activation of one or more T cells (e.g., in a subject), as compared to when a system, viral particle, engineered cell, or pharmaceutical composition that does not express the antigen (e.g., the same cell) is used. In some embodiments, the number and/or activation of MHC class Ib-restricted T cells is increased. In some embodiments, the MHC class Ib molecule is a human HLA-E, HLA-F, and/or HLA-G molecule. In some embodiments, the MHC class Ib molecule is a macaque Mamu-E, Mamu-F, and/or Mamu-AG molecule. In some embodiments, the MHC class Ib molecule is a mouse Qa-1 molecule.

In some embodiments, the immune response that is induced (e.g., in a subject) comprises a lower $CD8^+$ T cell response as compared to the $CD8^+$ T cell response that is induced using a system, viral particle, engineered cell, or pharmaceutical composition that does not express the antigen in a cell (e.g., the same cell).

In some embodiments, the protective immune response that is induced (e.g., in a subject) comprises reduced or limited expression and/or activity of a cytokine (e.g., IP-10, MCP-1) that promotes harmful inflammation as compared to the immune response that is induced using a system, viral particle, engineered cell, or pharmaceutical composition that does not express the antigen in a cell (e.g., the same cell).

In yet another aspect, methods for preventing and/or treating diseases (e.g., in a subject) are provided herein. In some embodiments, the method comprises administering a recombinant polynucleotide (i.e., for expressing an antigen in a cell) of the present invention (e.g., a therapeutically effective amount thereof) to a subject (e.g., a subject in need thereof). In some embodiments, the method comprises administering a pharmaceutical composition (e.g., a therapeutically effective amount thereof) of the present invention to a subject.

Any number of diseases can be prevented and/or treated using compositions and/or methods of the present invention. In some embodiments, an infectious disease is prevented and/or treated. In other embodiments, cancer is prevented and/or treated. In some embodiments, an infectious disease and/or cancer are treated.

In some embodiments, a bacterial infectious disease is prevented and/or treated. In some embodiments, a viral infectious disease is prevented and/or treated. In some embodiments, a fungal infectious disease is prevented and/or treated. In some embodiments, a protozoal infectious disease is prevented and/or treated. In some embodiments, a helminthic infectious disease is prevented and/or treated. In some embodiments, a bacterial, viral, fungal, protozoal, and/or helminthic infectious disease is prevented and/or treated. In particular embodiments, the infectious disease is caused by a parasite. Non-limiting examples of viral infectious diseases that can be prevented and/or treated by the compositions and methods of the present invention include those caused by simian immunodeficiency virus (SIV), human immunodeficiency virus (HIV), hepatitis C virus, herpes simplex virus 1, herpes simplex virus 2, varicella-zoster virus, *Human cytomegalovirus*, human herpesvirus 6A, human herpesvirus 6B, human herpesvirus 7, human herpesvirus 8, Epstein-Barr virus, and hemorrhagic fever virus.

Non-limiting examples of cancers that can be prevented and/or treated using compositions and methods of the present invention include colorectal cancer, colon cancer, anal cancer, liver cancer, ovarian cancer, breast cancer, lung cancer, bladder cancer, thyroid cancer, pleural cancer, pancreatic cancer, cervical cancer, prostate cancer, testicular cancer, bile duct cancer, gastrointestinal carcinoid tumors, esophageal cancer, gall bladder cancer, rectal cancer, appendix cancer, small intestine cancer, stomach (gastric) cancer, renal cancer (e.g., renal cell carcinoma), cancer of the central nervous system, skin cancer, oral squamous cell carcinoma, choriocarcinomas, head and neck cancers, bone cancer, osteogenic sarcomas, fibrosarcoma, neuroblastoma, glioma, melanoma, leukemia (e.g., acute lymphocytic leukemia, chronic lymphocytic leukemia, acute myelogenous leukemia, chronic myelogenous leukemia, or hairy cell leukemia), lymphoma (e.g., non-Hodgkin's lymphoma, Hodgkin's lymphoma, B-cell lymphoma, or Burkitt's lymphoma), and multiple myeloma. In some embodiments, the cancer is melanoma, ovarian cancer, or prostate cancer.

Compositions and methods of the present invention can be used to treat cancer at any stage. In some embodiments, the cancer is an advanced cancer. In some embodiments, the cancer is a metastatic cancer. In some embodiments, the cancer is a drug-resistant cancer.

In some embodiments, the subject is treated (e.g., an immune response against an antigen is induced) before any symptoms or sequelae of the disease (e.g., infectious disease, or cancer) develop. In other embodiments, the subject has signs, symptoms, or sequelae of the disease. In some instances, treatment results in a reduction or elimination of the signs, symptoms, or sequelae of the disease.

In some embodiments, prevention and/or treatment includes administering compositions of the present invention directly to a subject. As a non-limiting example, pharmaceutical compositions of the present invention (e.g., comprising a system, viral particle, and/or engineered cell of the present invention and a pharmaceutically acceptable carrier) can be delivered directly to a subject (e.g., by local injection or systemic administration). In some instances, intratumoral injection is used. In other embodiments, the compositions of the present invention are delivered to an engineered cell or population of engineered cells, and then the engineered cell or population of engineered cells is administered or transplanted into the subject. The engineered cell or population of engineered cells can be administered or transplanted with a pharmaceutically acceptable carrier. In certain instances, progeny of the engineered cell or population of engineered cells are transplanted into the subject. Procedures for transplantation and administration will be known to one of skill in the art.

Compositions of the present invention may be administered as a single dose or as multiple doses, for example two doses administered at an interval of about one month, about two months, about three months, about six months, or about 12 months. Other suitable dosage schedules can be determined by a medical practitioner.

In some embodiments, additional compounds or medications can be co-administered to the subject. Such compounds or medications can be co-administered for the purpose of alleviating signs or symptoms of the disease being treated, reducing side effects caused by induction of the immune response, etc.

In some embodiments, a sample (e.g., a test sample or a reference sample) is obtained from a subject (e.g., a subject in whom an immune response against an antigen is to be induced or a subject in whom a disease is to be prevented and/or treated). In particular embodiments, the sample is obtained for the purposes of determining the presence or level of one or biomarkers. Determining the presence or level of biomarkers(s) can be used to, as non-limiting examples, determine response to treatment or to select an appropriate composition or method for the prevention or treatment of a disease.

In some embodiments, a test sample is obtained from the subject. The test sample can be obtained before and/or after a composition of the present invention is administered to the subject. Non-limiting examples of suitable samples include blood, serum, plasma, cerebrospinal fluid (CSF), tissue, saliva, urine, and combinations thereof. In some instances, the sample comprises normal tissue. In other instances, the sample comprises abnormal tissue (e.g., cancer tissue). The sample can also be made up of a combination of normal and abnormal cells (e.g., cancer cells). In some instances, the sample is obtained as a biopsy sample or fine needle aspirate (FNA) sample. In some embodiments, the tissue comprises one or more types of immune cells.

In some embodiments, a reference sample is obtained. The reference sample can be obtained, for example, from the subject (i.e., the subject being treated or in whom an immune response is being induced). The reference sample can be also be obtained from a different subject and/or a population of subjects. In some instances, the reference sample is either obtained from the subject, a different subject, or a population of subjects before and/or after a composition of the present invention is administered to the subject, and comprises normal tissue. In other instances, the reference sample comprises abnormal tissue and is obtained from the subject and/or from a different subject or a population of subjects.

In some embodiments, the level of one or more biomarkers is determined in the test sample and/or reference sample. Non-limiting examples of suitable biomarkers include antigens, antibodies against antigens, immune cell numbers and/or activation levels, capacity for immune cell responses to an antigen after in vitro stimulation, immunostimulatory proteins, cytokines, interleukins, tumor necrosis factors, interferons, and other molecules that play roles in modulating immune responses. Further non-limiting examples of suitable biomarkers include C-reactive protein, interferon-gamma, IL-1beta, IL-4, IL-5, IL-6, IL-8, IL-10, IP-10, IL-12, IL-15, IL-13, IL-17, IL-21, MCP-1, MIP-1alpha, MIP-1beta, transforming growth factor-beta, tumor necrosis factor-alpha, and combinations thereof.

Typically, the level of a biomarker in a sample (e.g., test sample) is compared to the level of the biomarker in a reference sample. Depending on the biomarker, an increase or a decrease relative to a normal control or reference sample can be indicative of the presence of a disease, or response to treatment for a disease. In some embodiments, an increased level of a biomarker in a sample (e.g., test sample), and hence the presence of a disease (e.g., an infectious disease or cancer), increased risk of the disease, or response to treatment is determined when the biomarker levels are at least, e.g., about 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, 5-fold, 6-fold, 7-fold, 8-fold, 9-fold, 10-fold, 11-fold, 12-fold, 13-fold, 14-fold, 15-fold, 16-fold, 17-fold, 18-fold, 19-fold, or 20-fold higher in comparison to a negative control. In other embodiments, a decreased level of a biomarker in the test sample, and hence the presence of the disease, increased risk of the disease, or response to treatment is determined when the biomarker levels are at least, e.g., about 1.1-fold, 1.2-fold, 1.3-fold, 1.4-fold, 1.5-fold, 1.6-fold, 1.7-fold, 1.8-fold, 1.9-fold, 2-fold, 3-fold, 4-fold, 5-fold, 6-fold, 7-fold, 8-fold, 9-fold, 10-fold, 11-fold, 12-fold, 13-fold, 14-fold, 15-fold, 16-fold, 17-fold, 18-fold, 19-fold, or 20-fold lower in comparison to a negative control.

The biomarker levels can be detected using any method known in the art, including the use of antibodies specific for the biomarkers. Exemplary methods include, without limitation, PCR, Western Blot, dot blot, enzyme-linked immunosorbent assay (ELISA), radioimmunoassay (MA), immunoprecipitation, immunofluorescence, FACS analysis, electrochemiluminescence, and multiplex bead assays (e.g., using Luminex or fluorescent microbeads). In some instances, nucleic acid sequencing is employed.

In certain embodiments, the presence of decreased or increased levels of one or more biomarkers is indicated by a detectable signal (e.g., a blot, fluorescence, chemiluminescence, color, radioactivity) in an immunoassay or PCR reaction (e.g., quantitative PCR). This detectable signal can be compared to the signal from a reference sample or to a threshold value.

In some embodiments, the results of the biomarker level determinations are recorded in a tangible medium. For example, the results of diagnostic assays (e.g., the observation of the presence or decreased or increased presence of one or more biomarkers) and the diagnosis of whether or not there is an increased risk or the presence of a disease (e.g., an infectious disease or cancer) or whether or not a subject is responding to treatment can be recorded, e.g., on paper or on electronic media (e.g., audio tape, a computer disk, a CD, a flash drive, etc.).

In other embodiments, the methods further comprise the step of providing the diagnosis to the patient (i.e., the subject) and/or the results of treatment.

5. Kits

In another aspect, kits are provided herein. In some embodiments, the kit comprises a system (i.e., for expressing an antigen in a cell) of the present invention, a recombinant polynucleotide of the present invention, and/or a pharmaceutical composition of the present invention (e.g., comprising a recombinant polynucleotide of the present invention and a pharmaceutically acceptable carrier). In some embodiments, the kit is for inducing an immune response against an antigen (e.g., in a subject). In other embodiments, the kit is for preventing or treating a disease. In particular embodiments, the kit is for preventing or treating an infectious disease described herein and/or a cancer described herein.

Kits of the present invention can be packaged in a way that allows for safe or convenient storage or use (e.g., in a box or other container having a lid). Typically, kits of the present invention include one or more containers, each container storing a particular kit component such as a reagent, a control sample, and so on. The choice of container will depend on the particular form of its contents, e.g., a kit component that is in liquid form, powder form, etc. Furthermore, containers can be made of materials that are designed to maximize the shelf-life of the kit components. As a non-limiting example, kit components that are light-sensitive can be stored in containers that are opaque.

In some embodiments, the kit contains one or more reagents. In some instances, the reagents are useful for transfecting or transforming an engineered cell with a recombinant polynucleotide that is part of a system of the present invention. The kit may also comprise one or more reagents useful for delivering recombinant polynucleotides (i.e., that are found in systems of the present invention) or viral particles of the present invention into a cell and/or for administering a pharmaceutical composition of the present invention to a subject. In yet other embodiments, the kit further comprises instructions for use.

6. Examples

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1. Vaccination Using CMV Genomes in Nucleic Acid Form

*Cytomegaloviruses* and other herpesviruses represent a promising vaccine platform for protection of people against infectious diseases (including the herpesviruses themselves) and cancer. These vaccines are based on recombinant herpesvirus genomes that are recovered as a replicating virus in tissue culture, which is then expanded by serial passage, purified, and concentrated. The problem is that mutations can be introduced into herpesvirus-based vaccines during serial passage. The invention presented here solves that problem by administration of the recombinant herpesvirus genomes themselves, in nucleic acid form, to subjects requiring vaccination.

Herpesvirus-based vaccines can suffer mutations during serial passage, demonstrating genetic instability. We observed during routine characterization of our RhCMV/SIV vaccine stocks that most contain variable levels of rearrangements in the vaccine antigen. This instability is not unexpected, as the fibroblastic-tropic RhCMV strain on which RhCMV/SIV vaccines are based, 68-1, arose via spontaneous mutation during passage in tissue culture (Refs. 1-4). For a DNA virus, in fact, CMV generally exhibits remarkable sequence diversity in vitro and in vivo. Gradual alteration of human CMV can be observed during 4-40 in vitro passages (Ref 5). In vivo HCMV genetic diversity is exceptionally high both within and between hosts, comparable with diversity observed in RNA viruses (Refs. 6,7). Even unpassaged clinical isolates have been shown to contain gene-disrupting mutations in at least 26 genes including RLSA, UL1, UL9, UL18, UL40, UL111A, UL142, UL147, and UL150 (Ref. 8). Alterations such as these in the vaccine virus would be likely to impact vaccine efficacy. HCMV UL40, for example, codes for a leader peptide known to modulate HLA-E expression (Ref. 9), which would be expected to alter HLA-E-restricted immune responses; UL111A codes for the viral IL-10 gene, whose importance to CMV immunology we have shown above and in many publications (Refs. 10-16).

Using RhCMV/SIV vaccine BAC DNA (RhCMV/SIVgag, RhCMV/SIVenv, and RhCMV/SIVretanef), we recovered virus by transfection into telomerized fibroblasts, and tested for gross deletions in the transgene region by PCR. We found that all RhCMV/SIV vaccines underwent some deletion in the transgene cassette on serial passage, although this tendency is most extreme with RhCMV/SIVgag (FIG. 1A). In the worst cases the vast majority of replicating virus contains a deletion (FIG. 1A, "P7"). We cloned and sequenced the most common deleted fragment and observed that the deletion spans the promoter and 5' end of the gag coding sequence, but that the 3' Flag tag remains intact (FIG. 1B). To determine if deleted species retained some promoter function, we infected telomerized fibroblasts and stained for the RhCMV genome by RNAscope and for Flag-tagged protein by immunohistochemistry. Fewer than 25% of RhCMV/SIVgag-transduced cells expressed Gag-Flag protein, indicating that the deleted species were indeed unable to produce Gag (FIG. 1C).

We administered vaccine stocks containing both intact and deleted species to macaques. We designed a PCR primer pair that is specific for the most common deletion seen in the Gag transgene. We used this primer pair to test DNA extracted from the spleen and thymus of all vaccinated newborns and infants and detected the deletion in 3 of 12 and 7 of 12, respectively. This finding indicates that altered viruses in RhCMV/SIV vaccine preps are able to replicate and disseminate within vaccinated animals and may therefore affect immune responses.

Vaccination Using a *Cytomegalovirus* (CMV) Vaccine in its Nucleic Acid Form.

Presence of unintended variants such as those identified above in vaccine stocks is undesirable because the variants may provoke unwanted immune responses and/or render the vaccine ineffective. We therefore conceived the idea of administering cloned (i.e., homogeneous) CMV-based vaccine genomes to animals directly, without the intervening steps that are typically employed: "rescuing" the genome in cultured cells, thereby converting the genome to a replicating virus; expanding the rescued virus by serial passage; and finally purifying the resulting vaccine virus.

On administration to the animal, therefore, these vaccines are not contained within a CMV virus capsid. The vaccine's DNA may be administered in a "naked" form or may be complexed with reagents that assist in entry of the vaccine genome into the target cell. Reagents typically used include liposomes, cationic polymers such as PEI, or nanoparticles such as those constructed from calcium phosphate. On entry to the cell, the viral proteins needed for genome replication must then be expressed, some of which interact with the introduced vaccine genome. Generally if sufficient replication proteins are expressed and the introduced genomes have survived, then replication of the introduced genome will begin. For that replication to be efficient and possibly for subsequent packaging to occur, the introduced genome must have a certain structure.

In the case of many CMV genomes, the structure of a replicating genome is thought to be circular, which is why CMV genomes that are propagated as circular BACs can be easily rescued on re-introduction to the cell. The circular DNA serves as template for DNA replication, which generates large DNA concatemers. The concatemeric viral DNA is processed into unit-length genomes, which are packaged into capsids. Efficient packaging requires unit-length genomes within a certain size range. Sequences at the termini of the linear virion DNA, called terminal repeats, are thought to play a key role in both genome circularization and maturation.

When the introduced vaccine DNA has replicated and been packaged, the immunologic stimulus to the host is then effectively amplified, by production of new copies of the vaccine that are disseminated in capsid to new host cells. If the replicating vaccine is fully replication-competent, then the replication cycle may proceed again in subsequently infected host cells. If the replicating vaccine is partly replication competent, then replication may occur in a limited number of cycles in the host. Alternatively, if the replicating vaccine is self-inactivating, then the introduced vaccine genome may be limited to very few cycles of replication and release, so that the immunologic stimulus terminates after a certain period.

The advantages of introducing vaccine genomes without capsid are many: (i) As stated above, CMV-based vaccine vectors that are expanded in tissue culture undergo mutations. When CMV genomes are provided in nucleic acid form, therefore, the nucleic acid content of the administered vaccine is more precisely controlled. (ii) Vaccines to be provided in nucleic acid form have less or no requirement for refrigeration, allowing them to be used whenever the cold chain is unavailable, e.g., in under-resourced areas. (iii) Nucleic acid-based CMV vaccines are not vulnerable upon introduction to antibodies that may be raised in the recipient against protein components of the vaccine vector. In recipients having such antibodies, therefore, the nucleic-acid form of the vaccine will have greater effect. (iv) Because the precise quality of immune responses depends on route and kinetic of stimulus (perhaps because these vary the location and quantity of antigen), nucleic-acid-based CMV vaccines will stimulate qualitatively different immune responses vs. vaccines prepared as particles in tissue culture.

Placement of the Bacterial Artificial Chromosome (BAC) Origin of Replication at a CMV Genome Terminus.

The difficulty with the above scheme is that the cloned CMV vaccine genomes previously employed are not efficiently replicated and packaged due to their structure. The origin of replication for propagation in tissue culture is normally placed within the vaccine genome, which leads to reduced carrying capacity, poor replication of the vaccine genome after introduction to cells, and in many cases to unintended and/or undesirable expression of antibiotic-resistance genes in the vaccine recipient. The limitation on carrying capacity of the vaccine is due to the inherent preference of viral packaging machinery for genomes within a certain size range, and to existence of a maximum length above which genomes cannot be packaged. Introduction of a BAC origin of replication into the vaccine genome itself therefore uses space that could otherwise be employed for introduction of therapeutic genetic material, e.g., antigen sequences. Poor replication of the vaccine genome after introduction to cells may have several causes including an increased length of genetic material requiring replication with each cycle, interference with genetic regulatory elements (e.g., splicing signals) needed for vaccine replication, and inefficient packaging of genomes that approach the packaging limit. Finally, unintended and/or undesirable expression of antibiotic-resistance genes in the vaccine recipient may occur to read-through viral transcription of the antibiotic resistance genes or to presence of cryptic (unintended and unrecognized) promoters that are active in host cells.

To address these issues we invented herpesvirus- and/or CMV-based vaccine genomes with alternative arrangements of the terminal repeats, which permit more efficient replication and packaging of the vaccine genomes after introduction to host cells, and which also reduce or eliminate the propagation in the vaccinated host of sequences in the BAC origin of replication and/or of selective markers used in bacteria.

The CMV genome contains multiple direct terminal repeats, each comprising Pac1 and Pac2 sites. As rolling-circle replication occurs, multimers of the viral genome are created that require cleavage to unit length. This cleavage is accomplished by the viral terminase complex, which recognizes the terminal repeats that separate individual viral genome copies. It is thought that the replicating viral genome most often contains at least two terminal repeats in tandem (one from each end of the virus) and may contain three or more tandem copies. We reasoned that tandem repeats of the CMV terminal repeats are the most natural substrate for recognition and the most likely to mediate cleavage. Our constructs therefore consist of variable numbers of direct terminal repeats, in various arrangements, flanking each side of the BAC and the core components required for propagation in *E. coli* host strains (FIGS. 2A-D).

The flanking direct repeats were cloned stepwise from an existing vaccine genome in BAC from, which contains two of these repeats. As a result of the organization of these repeat structures within our new constructs, the BAC and its core components are excised from the replicating viral genome by the viral terminase complex during packaging of the viral genome, eliminating the need to encode a recombinase gene within the BAC. In essence, due to placement of the direct viral terminal repeats around the BAC and its core components, our constructs are self-excising BACs that do not require expression of an exogenous recombinase.

Inactivated CMV-Vectored Vaccines via Deletion of Important Viral Genes.

It may be desirable to administer CMV-vectored vaccines to people of any age, from fetal (in utero) to aged. Wild-type CMV virus, however, can cause significant disease in young and/or immunocompromised hosts. This fact suggests that development of replication-competent, CMV-vectored vaccines that are proven safe for administration to all recipients will be difficult. A common strategy for creation of inactivated viral vaccine vectors is trans-complementation, that is, deletion of an important viral gene from the vaccine vector and growth of the vector in a cell line that provides the missing gene product in trans. Vaccine vectors grown in this way will not replicate in patients due to the absence of the gene. This strategy can sometimes be problematic, however, if the gene product is toxic to the cell line used for vaccine growth or if the vaccine lacking that gene product is highly attenuated, that is, if the vaccine grows poorly. By administering CMV-based vaccines in nucleic-acid form, these problems can be avoided: the vaccine is provided to the patient as nucleic acid, obviating the need for a trans-complementing cell line and yet permitting expression of all the included viral proteins, which might span the life cycle of the virus (i.e., early and late genes may both be expressed). The CMV vaccines provided in nucleic acid form might lack, for example, glycoprotein H, glycoprotein L, IE1/2, UL51, UL52, UL84, UL79, and/or UL87; a herpes simplex virus vaccine might lack these genes and/or glycoprotein D. After administration to a patient the vaccine genome can replicate and produce sufficient protein (derived either from the vector or from another therapeutic target) to generate a beneficial immune response in the host. However, due to absence or inactivation of an essential viral gene the progeny proteins and/or any progeny particles are incapable of any further rounds of replication.

Self-Inactivating CMV-Vectored Vaccines.

We describe a system for administration of CMV-vectored vaccines in DNA form that are "self-inactivating" due to ectopic placement of viral termini (which also serve as packaging and cleavage sites) so as to result in loss of essential genes from the virus as it is packaged. The method consists of placing one or more additional terminal repeat sequences either (i) between two essential CMV genes (see, e.g., PNAS 100:14223) or (ii) within an essential gene, but placed so that transcription and translation are not disturbed. In the former case, when the viral genome is packaged, cleavage sometimes occurs at the ectopic site, resulting in separate packaging of essential gene functions, which are therefore less likely to be co-delivered to a subsequent cellular target. In the latter case, when the viral genome is packaged, cleavage within the terminal repeat sequence leads to inactivation of the essential gene. The terminal repeat sequences may be complete or incomplete but contain sufficient sequences to sometimes direct cleavage by the CMV terminase complex.

We prepare three exemplary self-inactivating RhCMV vaccine genomes. In the first case, one or more terminal direct repeat (DRs) are placed within the essential IE1 and/or IE2 genes, e.g., between nucleotides 156,230 and 160,054 of NCBI accession number JQ795930.1. The DRs are placed in a non-coding region so that proteins IE1 and/or IE2 can be produced from an uncleaved genome. On packaging the sequences are sometimes cut, leading to production of progeny particles with incomplete or mutated IE1 and/or IE2 sequences.

In the second case, one or more terminal direct repeat (DRs) are placed between the essential Rh82 (UL51) and Rh83 (UL52) genes, e.g., between nucleotides 71,993 and 72,070 of NCBI accession number JQ795930.1. After replication, when the progeny genomes are cut, cleavage sometimes occurs between the UL51 and UL52 genes, leading to exclusion of one or the other gene from progeny. This exclusion leads to inactivation of some progeny virions because the UL51 gene is essential.

In the third case, an important viral gene is provided on the BAC "backbone" of the nucleic-acid form of the vaccine vector, e.g., within the BAC sequences shown in FIGS. 2A-D. That is, the important viral gene is essentially outside of the sequences that will be efficiently packaged into progeny virions. As a result, progeny virions that infect new cells will rarely or never have access to the gene's protein product. For example, an expression cassette for the CMV tegument protein, pp71 (product of the UL82 gene) is provided in the BAC "backbone" and the corresponding sequence is removed from the viral genome.

Alternatively, an expression cassette for the terminase component UL51 is provided in the BAC "backbone" and the corresponding sequence is removed from the viral genome. This construct is particularly appealing because the resulting viral genomes are capable of at least two-cycle replication. On delivery of the CMV-based vaccine in nucleic acid form to a cell, UL51 is provided in trans, allowing cleavage of progeny genomes and their packaging into fully infectious particles; however, many packaged genomes lack UL51 due to its placement within the BAC backbone. On subsequent infection of another cell with a progeny virus lacking UL51, a full second cycle of replication can occur, including production of new virions—but the viral nucleic acid cannot be packaged due to lack of UL51.

Administration With Adenovirus Particles as a Transduction Method.

The CMV and/or other herpes virus genomes described here are inefficiently internalized by host cells, as compared to smaller nucleic acids such as plasmids. When administered alone, access of the agents to the inside of cells may be facilitated by electroporation. Alternatively, the genomes may be administered with non-viral or viral agents that assist in delivery of genes to the inside of cells. Non-viral agents include cationic polymers, liposomes, calcium-phosphate precipitates, or nanoparticles. Viral agents include active or inactive particles of adenovirus, which has long been known to assist in delivery of nucleic acids to cells, most likely by disruption of host-cell endosomes, facilitating access of co-delivered nucleic acids to the cytoplasm. For example, we use active or inactive particles of adenovirus type 5 or type 26 to facilitate delivery of CMV genomes in nucleic acid form.

Viral agents used to assist in transduction of the vaccine genomes may also be used for trans-complementation of the inactivated or self-inactivating vaccines described above. For example, when an inactivated vaccine carrying a deletion in the UL51 gene is administered, an adenovirus may be given that provides the UL51 gene product in trans, that is, expressed from the adenoviral genome rather than the vaccine genome.

Production of CMV- or Herpesvirus-Based Vaccines by Single-Step Transfection In Vitro CMV- or herpesvirus-based vaccines are most commonly produced now by inefficient "rescue" of the engineered vaccine genome in tissue-culture cells, mediated by Cre recombinase-based excision of sequences that direct maintenance of the vaccine genome in bacterial cells (e.g., in "bacmid" form). Because rescue is inefficient, a small fraction of the tissue-culture cells that are transfected with "bacmid" are able to replicate the virus, resulting in a poor yield of infectious virus that must subsequently be expanded by serial passage. The vaccine genomes in nucleic-acid form that are described above permit a streamlined production process in which tissue-culture cells are transduced, possibly with assistance of the non-viral or viral gene-delivery agents, a significant fraction of transduced cells produce virions, and the virions are harvested without further expansion, or with very limited expansion. This process is possible because the genomes we provide in nucleic-acid form have an arrangement of terminal direct repeats that permits replication of the virus without recombinase-mediated excision.

References (Example 1)

1. Asher, D. M., C. J. Gibbs, Jr., D. J. Lang, D. C. Gajdusek, and R. M. Chanock, Persistent shedding of *Cytomegalovirus* in the urine of healthy *Rhesus* monkeys. Proc Soc Exp Biol Med, 1974. 145(3): p. 794-801.
2. Hansen, S. G., L. I. Strelow, D. C. Franchi, D. G. Anders, and S. W. Wong, Complete sequence and genomic analysis of *Rhesus cytomegalovirus*. J Virol, 2003. 77(12): p. 6620-36.
3. Oxford, K. L., L. Strelow, Y. Yue, W. L. Chang, K. A. Schmidt, D. J. Diamond, and P. A. Barry, Open reading frames carried on UL/b' are implicated in shedding and horizontal transmission of *Rhesus cytomegalovirus* in *Rhesus* monkeys. J Virol, 2011. 85(10): p. 5105-14.
4. Tarantal, A. F., M. S. Salamat, W. J. Britt, P. A. Luciw, A. G. Hendrickx, and P. A. Barry, Neuropathogenesis induced by *Rhesus cytomegalovirus* in fetal *Rhesus* monkeys (*Macaca mulatta*). J Infect Dis, 1998. 177(2): p. 446-50.
5. Huang, E. S., S. M. Huong, G. E. Tegtmeier, and C. Alford, *Cytomegalovirus*: genetic variation of viral genomes. Ann N Y Acad Sci, 1980. 354: p. 332-46.
6. Renzette, N., L. Gibson, B. Bhattacharjee, D. Fisher, M. R. Schleiss, J. D. Jensen, and T. F. Kowalik, Rapid intrahost evolution of *Human cytomegalovirus* is shaped by demography and positive selection. PLoS Genet, 2013. 9(9): p. e1003735.
7. Renzette, N., L. Gibson, J. D. Jensen, and T. F. Kowalik, *Human cytomegalovirus* intrahost evolution-a new avenue for understanding and controlling herpesvirus infections. Curr Opin Virol, 2014. 8: p. 109-15.
8. Cunningham, C., D. Gatherer, B. Hilfrich, K. Baluchova, D. J. Dargan, M. Thomson, P. D. Griffiths, G. W. Wilkinson, et al., Sequences of complete *Human cytomegalovirus* genomes from infected cell cultures and clinical specimens. J Gen Virol, 2010. 91(Pt 3): p. 605-15.
9. Prod'homme, V., P. Tomasec, C. Cunningham, M. K. Lemberg, R. J. Stanton, B. P. McSharry, E. C. Wang, S. Cuff, et al., *Human cytomegalovirus* UL40 signal peptide regulates cell surface expression of the NK cell ligands HLA-E and gpUL18. J Immunol, 2012. 188(6): p. 2794-804.
10. Chang, W. L. and P. A. Barry, Attenuation of innate immunity by *Cytomegalovirus* IL-10 establishes a long-term deficit of adaptive antiviral immunity. Proc Natl Acad Sci USA, 2010. 107(52): p. 22647-52.
11. Eberhardt, M. K., W. L. Chang, N. J. Logsdon, Y. Yue, M. R. Walter, and P. A. Barry, Host immune responses to a viral immune modulating protein: immunogenicity of viral interleukin-10 in *Rhesus cytomegalovirus*-infected *Rhesus* macaques. PLoS One, 2012. 7(5): p. e37931.
12. Eberhardt, M. K., A. Deshpande, W. L. Chang, S. W. Barthold, M. R. Walter, and P. A. Barry, Vaccination against a virus-encoded cytokine significantly restricts viral challenge. J Virol, 2013. 87(21): p. 11323-31.
13. Eberhardt, M. K., A. Deshpande, J. Fike, R. Short, K. A. Schmidt, S. A. Blozis, M. R. Walter, and P. A. Barry, Exploitation of Interleukin-10 (IL-10) Signaling Pathways: Alternate Roles of Viral and Cellular IL-10 in *Rhesus Cytomegalovirus* Infection. J Virol, 2016. 90(21): p. 9920-9930.
14. Lockridge, K. M., S. S. Zhou, R. H. Kravitz, J. L. Johnson, E. T. Sawai, E. L. Blewett, and P. A. Barry, *Primate cytomegaloviruses* encode and express an IL-10-like protein. Virology, 2000. 268(2): p. 272-80.
15. Spencer, J. V., K. M. Lockridge, P. A. Barry, G. Lin, M. Tsang, M. E. Penfold, and T. J. Schall, Potent immunosuppressive activities of *Cytomegalovirus*-encoded interleukin-10. J Virol, 2002. 76(3): p. 1285-92.
16. Yue, Y., A. Kaur, M. K. Eberhardt, N. Kassis, S. S. Zhou, A. F. Tarantal, and P. A. Barry, Immunogenicity and protective efficacy of DNA vaccines expressing *Rhesus cytomegalovirus* glycoprotein B, phosphoprotein 65-2, and viral interleukin-10 in *Rhesus* macaques. J Virol, 2007. 81(3): p. 1095-109.

Example 2. Developing a Scalable, Nucleic Acid-Based Formulation of *Cytomegalovirus*-Vectored Vaccines That can be Distributed Without a Cold Chain The present example provides a scalable, nucleic acid-based formulation of *Cytomegalovirus*-vectored vaccines that can be distributed without a cold chain. Despite a massive allocation of capital and human resources, attempts to develop an effective HIV vaccine have so far been disappointing. Nonetheless, vaccines using *Cytomegalovirus* (CMV) as delivery vector and immunomodulatory adjuvant have shown extraordinary promise. In our preliminary work, for example, a *Rhesus cytomegalovirus*-vectored SIV vaccine lacking the viral IL-10 gene (RhCMVdIL10-SIV) protected ⅘ infants from SIV infection whereas an earlier generation of the technology protected none.

Manufacturing and distribution of CMV-based vaccines present daunting challenges: (i) replication of CMV in culture is markedly slower than that of other vaccine vectors; (ii) CMV undergoes genetic change when amplified in culture; (iii) the virus is enveloped and thus difficult to separate from cell- and virus-derived lipid bilayers of a similar size; (iv) methods for extreme concentration of the heterogeneous particles are unknown; and (v) a cold chain is required for distribution.

To eliminate these problems, we created technology for vaccine delivery using purified CMV genomes propagated in *E. coli*. The genomes carry a unique arrangement of the viral termini that permits efficient "rescue" of the genomes after introduction to mammalian cells without the recombinase-based excision that is normally used. These unique vaccine vectors are rescued more efficiently than standard CMV genomes after transfection into tissue-culture cells. No other group has achieved this because standard BACs carrying CMV genomes rely on excision of the BAC sequences by recombinases or restriction enzymes. Our design instead allows for excision of BAC sequences by the endogenous CMV packaging machinery, using the junctional sequences normally recognized by that machinery. This technology allows us to introduce circular vaccine genomes with enhanced stability that are uniformly competent for replication and packaging, leading to efficient conversion of the introduced genomes to replicating virus.

Similarly efficient rescue in vivo allows immune responses that are equivalent to those provoked by conventional vaccination with virions. Furthermore, efficient rescue of vaccine genomes in BAC form permits the creation of true single-cycle CMV vaccines, which replicate their DNA but do not produce progeny and which have long been sought by the field (Ref. 1).

We first assess antigen expression and vaccine vector replication after delivery of RhCMVdIL10-SIVgag and -HIVgag vaccines as naked DNA, with the cationic polymer PEI, or by PEI-adenofection. RhCMV-vectored vaccines given as virions first replicate locally, leading to inflammatory cell influx, and then systemically, leading to viral gene expression in distant tissues.

The sequence heterogeneity is characterized of RhCMVdIL10-SIVgag and -HIVgag BACs produced at small scale and with minimal endotoxin contamination (<0.15 EU/μg DNA).

PEI:DNA and PEI:DNA:adenoviral vaccine formulations are delivered to three *Rhesus* macaques each, and vaccine vector replication at the site of injection and in blood, by histology and PCR, is evaluated.

We next test if innate and adaptive immune responses to vaccination with nucleic-acid forms of RhCMVdIL10-SIVgag and -HIVgag are comparable to protective anti-SIV responses observed previously with encapsidated live virus. Previous studies have shown that protection against SIV is associated with specific immune responses, particularly Mamu-E-restricted $CD8^+$ T cell responses.

Using serially harvested PBMC and LNMC from macaques immunized with vaccine genomes, we evaluate (i) early and late transcriptomic responses reflective of innate and mixed innate/adaptive responses, respectively, (ii) T-cell responses to the vaccine antigen, and (iii) phenotypic changes in immune cells that are characteristic of CMV-vectored vaccine recipients.

In phase II, we (i) demonstrate that macaques vaccinated with nucleic acid are protected against SIV challenge and (ii) continue parallel development of orthologous HCMV-HIVgag vaccines. At completion of Phase II, clinical development of an HIV vaccine is pursued that is reproducibly manufacturable at the scale needed to improve human health globally Significance This vaccine technology has a unique arrangement of viral termini (see Innovation section) that permits efficient "launching" of the vaccine to its replicating, encapsidated form.

RhCMV-vectored SIV vaccines provide impressive protection: *Rhesus cytomegalovirus* (RhCMV)-vectored vaccines were designed to exploit a putative window of vulnerability in early HIV/SIV infection (Refs. 2-7), based on their ability to elicit and maintain high frequency, effector-differentiated, broadly targeted virus-specific T cells in sites of early viral replication (Refs. 8-10). Indeed, the pattern of protection observed in approximately 50% of RhCMV/SIV vector-vaccinated *Rhesus* macaques after SIVmac239 challenge was consistent with suppression of the nascent infection before significant spread to peripheral lymphoid organs (Ref. 8). Protected macaques manifested acute transient viremia followed by control of plasma SIV to below the level of detection, except for occasional plasma viral 'blips' that waned over time, and at necropsy demonstrated only trace levels of tissue-associated SIV RNA and DNA using ultrasensitive assays. In most protected animals, no virus can be detected by any technique; such animals are considered completely protected.

Of note, protection using these first-generation vectors has only been demonstrated for wild-type RhCMV-seropositive (wtRhCMV+) adult macaques, and the first-generation vaccines fail to protect infants or wtRhCMV-seronegative animals (see Preliminary Data). Vaccines that protect animals of every age and serostatus, however, lack CMV's immunosuppressive viral IL-10 gene.

Correlates of RhCMV/SIV-mediated protection: The mechanism of RhCMV/SIV-mediated protection is incompletely understood. An adaptive immune response to the vaccination antigen is required, because "empty" vaccines lacking antigen do not elicit immunity (Ref 11). Furthermore, the vaccines elicit robust, uniquely broad T cell responses with effector-memory cell phenotype and non-canonical MHC restriction (Refs. 9,10,12). However, the frequency of such T cells within a vaccinated cohort does not predict efficacy. It has become clear that T cell responses are insufficient alone to explain protection—some other pre-existing host characteristic or feature of the innate immune response is also required (Refs. 13, 14).

A transcriptomic study was undertaken to identify new potential correlates of protection (Ref. 14). The results demonstrate a remarkable separation between protected and unprotected animals very early after vaccination. The transcriptomic signature of protection derived from the analysis appears with-in one day of priming and is strongest by 3 days—pointing to an innate immune response as crucial. Highly connected nodes in the protective network include CD80 (down), STAT1, IRF1, IRF7, TLR3, TLR4, and TLR7.

Implications: *Cytomegalovirus*-based vectors are extraordinarily promising HIV vaccine candidates. However, as human therapeutics the vaccines present challenges that include notoriously slow growth in culture, a significant tendency to genetic alteration, and the likelihood of delayed protection in CMV-positive people. The present invention solves these problems by providing nucleic acid-based forms of the vaccines. These bacterial artificial chromosomes have a unique arrangement of the viral termini that results in automatic excision of bacterial origins of replication by the CMV terminase complex, which facilitates launching of the vaccines into replicating form.

Innovation

Novel improved RhCMV-SIV vaccine: First-generation RhCMV-SIV vectors carry an intact, endogenous viral IL-10 gene, which suppresses host immune responses (Refs. 15-17). This gene was identified and studied in primate CMVs (Refs. 18, 19), and based on this work a second-generation RhCMV vector platform was created—viral IL-10-deficient RhCMV or RhCMVdIL10—that, as shown below, has unique immunologic features and can protect wtRhCMV-negative infant macaques while first-generation vaccines do not (Ref. 15).

Nucleic-acid formulations of CMV-vectored vaccines: The cloned CMV vaccine genomes previously employed are not efficiently replicated and packaged due to their structure. The origin of replication for propagation in E. coli is normally placed within the vaccine genome, which impedes replication of vector DNA in mammalian cells until the origin can be excised by Cre. Although this DNA can be administered to monkeys and will launch replicating virus, this process suffers from the same inefficiencies as in tissue culture; furthermore, unintended and undesirable expression of both recombinase and adjacent antibiotic-resistance genes may occur.

Figure 3:
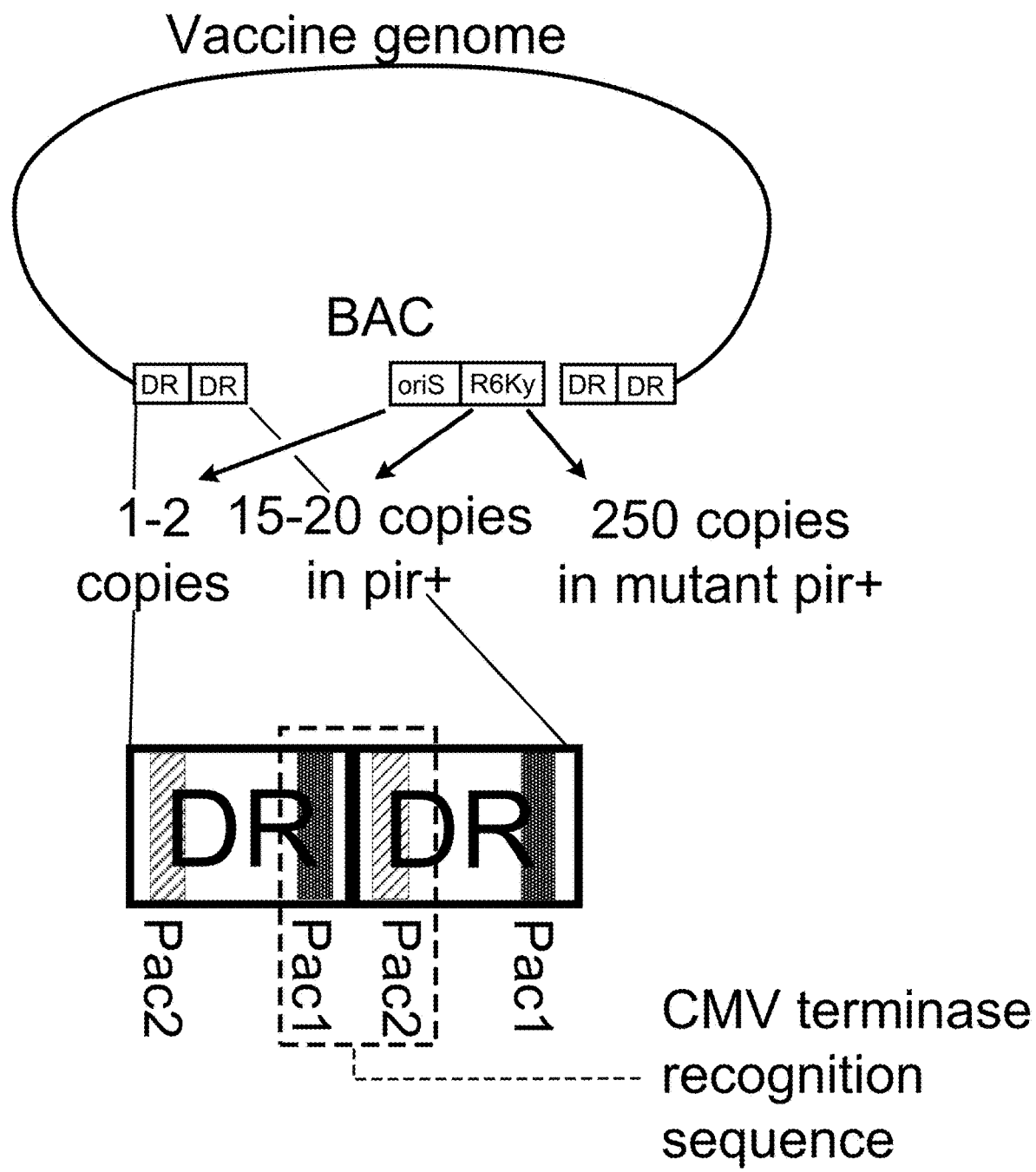
FIG. 3. Self-launching CMV-vectored vaccine genomes. Molecular arrangement of BACs that are excised from the viral genome by the CMV terminase complex after replication and thus do not require exogenous recombinase. Top, the viral genome and BAC are separated by terminal direct repeats (DR), so that the genome is essentially a large insert in the BAC. Middle, the BAC genome contains origins that direct maintenance in bacteria at single to high copies. Bottom, each DR contains Pac1 and Pac2 sites that when juxtaposed form the terminase recognition sequence. Use of repeated DRs is therefore critical as otherwise the recognition sequence is not formed.

The present invention overcomes these limitations by providing vaccine genomes with alternative arrangements of the terminal repeats, which permit efficient replication and packaging of the vaccine genomes after introduction to host cells, and which also eliminate the propagation in the vaccinated host of selective-marker or recombinase sequences. Two improvements are shown in FIG. 3. First, in these vaccines, the bacterial sequences ("BAC" in the figure) are flanked by recognition signals for the viral terminase complex, which cleaves multimers of the viral genome to unit length. The recognition sequence is composed of juxtaposed Pac2 and Pac1 sites derived from the virus's direct terminal repeats. These genomes retain the inherent stability of circular DNA (vs. linear genomes excised from a BAC by restriction digest, Ref. 20) but also do not require recombinase activity for efficient packaging. The result is a "self-launching" vector genome that sheds prokaryotic DNA as a normal part of the viral life cycle. Second, in these vaccines the conventional BAC origin of replication (oriS) is supplemented with an R6Kγ origin of replication. The latter origin drives replication to 15-20 copies per cell after introduction into strains containing a wild-type pir gene and ~250 copies per cell in strains expressing mutant pir.

Experimental Approach and Results

RhCMVdIL10-SIVgag vaccine efficacy in infant macaques: First-generation RhCMV-SIV vaccines include the rhcmvIL-10 gene, which is expected to impact the frequency and character of responding T cells. We created new RhCMV vaccine vectors lacking viral IL-10.25, RhCMV-SIVgag (first generation) or RhCMVdIL10-SIVgag vaccines, which were administered to RhCMV-seronegative infant macaques (10-12 months of age) using identical prime-and-boost protocols. Strikingly, serial monitoring of viral loads demonstrated no instance of stringent protection in any infant receiving first-generation vaccine (FIG. 4A); however, 4/6 monkeys receiving RhCMVdIL10-SIVgag were protected (FIG. 4B). Viral load profiles in the most stringently protected animals (3/6) were identical to those observed in adult macaques protected by 1st-gen vaccine.

To test if vaccine-mediated protection was characterized by a specific innate immune response to vaccination, we performed 3' tag sequencing of PBMC. Changes in genes of innate immune pathways were assessed by restricting the differentially expressed gene list to genes in the set/pathway, performing principal component analysis with log 2 fold changes of those genes, and assigning to each animal the score yielded by PCA (high scores indicate coordinated changes in all pathway genes). We observed impressive correlation between the magnitude of these changes and vaccine-mediated protection; for example, all protected animals receiving RhCMVdIL10-SIVgag vaccine demonstrated impressive changes in the inflammasome and TLR pathways, while the changes seen in unprotected animals were minor (FIGS. 4C-D). Comparison of these and previous results (Ref 14) shows that when RhCMVdIL10-SIVgag vaccination was effective it provoked a significant innate immune response identical to that seen when wtRhCMV+ macaques are protected by first-generation RhCMV/SIVgag.

Genetic instability of RhCMV/SIV vaccine stocks: During routine characterization of our RhCMV/SIV vaccine stocks, we observed that most contain variable levels of rearrangements in the vaccine antigen. This instability is not unexpected, as the fibroblastic-tropic RhCMV strain on which RhCMV/SIV vaccines are based, 68-1, arose via spontaneous mutation during passage in tissue culture (Refs. 26-29). For a DNA virus, in fact, CMV generally exhibits remarkable sequence diversity in vitro and in vivo. Gradual alteration of human CMV can be observed during 4-40 in vitro passages (Ref. 30). In vivo HCMV genetic diversity is exceptionally high both within and between hosts, comparable with diversity observed in RNA viruses (Refs. 31,32). Even unpassaged clinical isolates have been shown to contain gene-disrupting mutations in at least 26 genes including RLSA, UL1, UL9, UL18, UL40, UL111A, UL142, UL147, and UL150.33. Alterations such as these in the vaccine virus would be likely to impact vaccine efficacy.

We obtained RhCMV/SIV vaccine BAC DNA (RhCMV/SIVgag, RhCMV/SIVenv, and RhCMV/SIVretanef), recovered virus by transfection into telomerized fibroblasts, and tested for gross deletions in the transgene region by PCR. We found that all RhCMV/SIV vaccines underwent some deletion in the transgene cassette on serial passage, although this tendency is most extreme with RhCMV/SIVgag (FIG. 1A). In the worst cases the vast majority of replicating virus contains a deletion (FIG. 1A, "P7"). We cloned and sequenced the most common deleted fragment and observed that the deletion spans the promoter and 5' end of the gag coding sequence, but that the 3' Flag tag remains intact (FIG. 1B). To determine if deleted species retained some promoter function, we infected telomerized fibroblasts and stained for the RhCMV genome by RNAscope and for Flag-tagged protein by immunohistochemistry. Fewer than 25% of RhCMV/SIVgag-transduced cells expressed Gag-Flag protein, indicating that the deleted species were indeed unable to produce Gag (FIG. 1C).

Replication of and immune responses to self-launching RhCMVdIL10 vaccine in vivo: Self-launching RhCMVdIL10-SIVgag and -HIVgag vaccine genomes are prepared and their replication evaluated in vitro. Cells transfected with self-launching vaccine DNA vs. a conventional RhCMV BAC requiring Cre-mediated excision manifest plaques earlier, e.g., after 5-6 days rather than the 7-10 days typically observed; furthermore, at five days the cultures contain more transcript for glycoprotein B (gB), a viral late gene.

To test if a conventional CMV BAC can stimulate immune responses in vivo, we administered 100 μg of pRhCMVdIL10-MAGEA4, a viral genome expressing the melanoma-associated antigen, MAGEA4, in complex with the polycation PEI and active or inactivated Ad26 (subcutaneously; methods described below). Immune responses to overlapping MAGEA4 peptides were assessed one and two weeks later. By the first week after vaccination, one of two animals receiving pRhCMV-MAGEA4 (i.e., not self-launching) in complex with PEI and Ad26 manifested immune responses that are detectable by flow cytometry (FIG. 5).

Research Design and Methods Part I. Antigen expression and vaccine vector replication are assessed after delivery of self-launching RhCMVdIL10-SIVgag and -HIVgag vaccines as naked DNA, with the cationic polymer PEI, or by PEI-adenofection.

Sequence heterogeneity is characterized of RhCMVdIL10-SIVgag and -HIVgag BACs produced at small scale and with minimal endotoxin contamination (<0.15 EU/μg DNA).

PEI:DNA and PEI:DNA:adenoviral vaccine formulations are delivered to three *Rhesus* macaques each and replication of the self-launching vectors at the site of injection and in blood, by histology and PCR, evaluated.

Demonstrate that vaccine vector genomes carrying self-launching bacterial origins of replication and prepared at single or low copy number replicate efficiently after injection into macaques.

Rationale: In contrast to live *Cytomegalovirus*, BACs have proven extraordinarily stable when grown either at one copy per bacterial cell or up to 20 copies per cell (Ref. 34). Although the sequence integrity of BACs has only rarely been investigated by deep sequencing, available studies suggest a very low mutation rate. In our own combined experience of several decades, we have never observed spontaneous deletions or duplications in *E. coli* that would be revealed by restriction enzyme digestion or PCR fragment length. Self-launching CMV BACs are converted to replicating virus substantially more efficiently than previous CMV BACs. Such conversion is also likely to take place in any cell of a vaccine recipient that efficiently takes up the vaccine genomes. Any such conversion event is likely to lead to widespread infection, because it is thought that one infectious CMV particle can lead to dissemination.

Experimental approach: RhCMVdIL10-SIVgag and -HIVgag vaccines are prepared in self-launching DNA form (~230 kb) using origins of replication that provide either 1 copy or ~20-250 copies per bacterial cell (depending in the latter case on the bacterial host). First, sequence heterogeneity is characterized in preparations of these six BACs by PCR and deep sequencing. Genomes with proven integrity and minimal endotoxin contamination are then selected for formulation as DNA, DNA:PEI, or DNA:PEI:Ad26. After administration to macaques, the extent of "rescue" of live vaccine is assessed.

Figure 5:
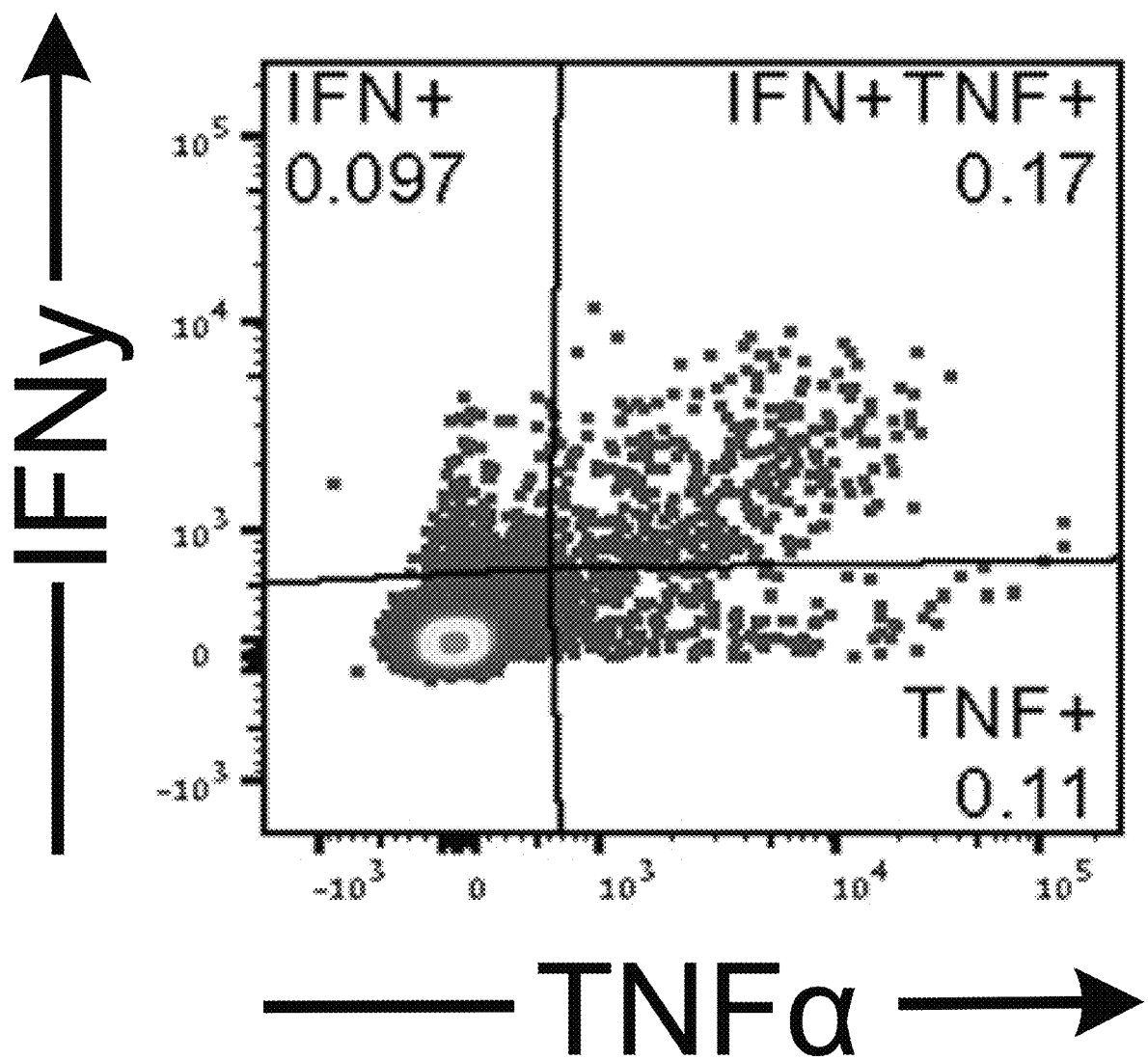
FIG. 5. CMV BAC DNA produces immune responses in vivo. Immune responses to pRhC-MV-MAGEA4 seen as early as one week after priming.
Figure 6:
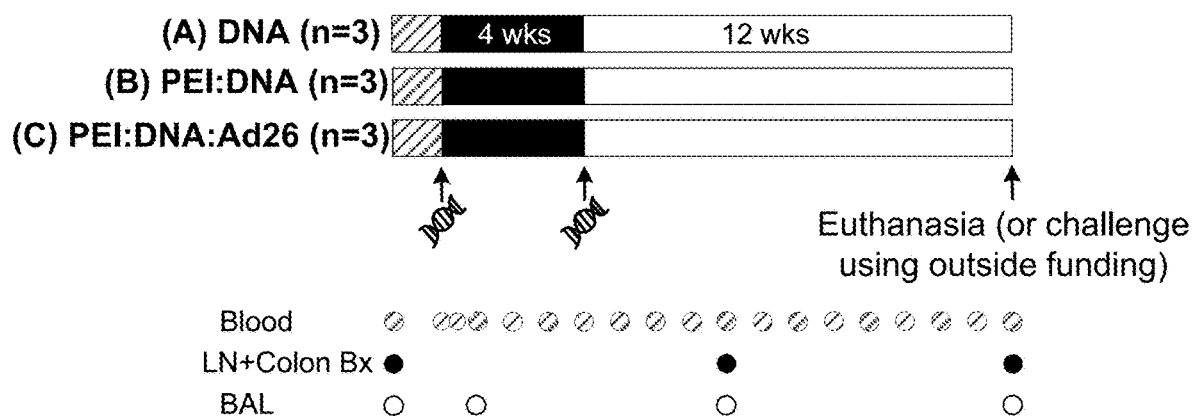
FIG. 6. In vivo timeline.
Figure 7:
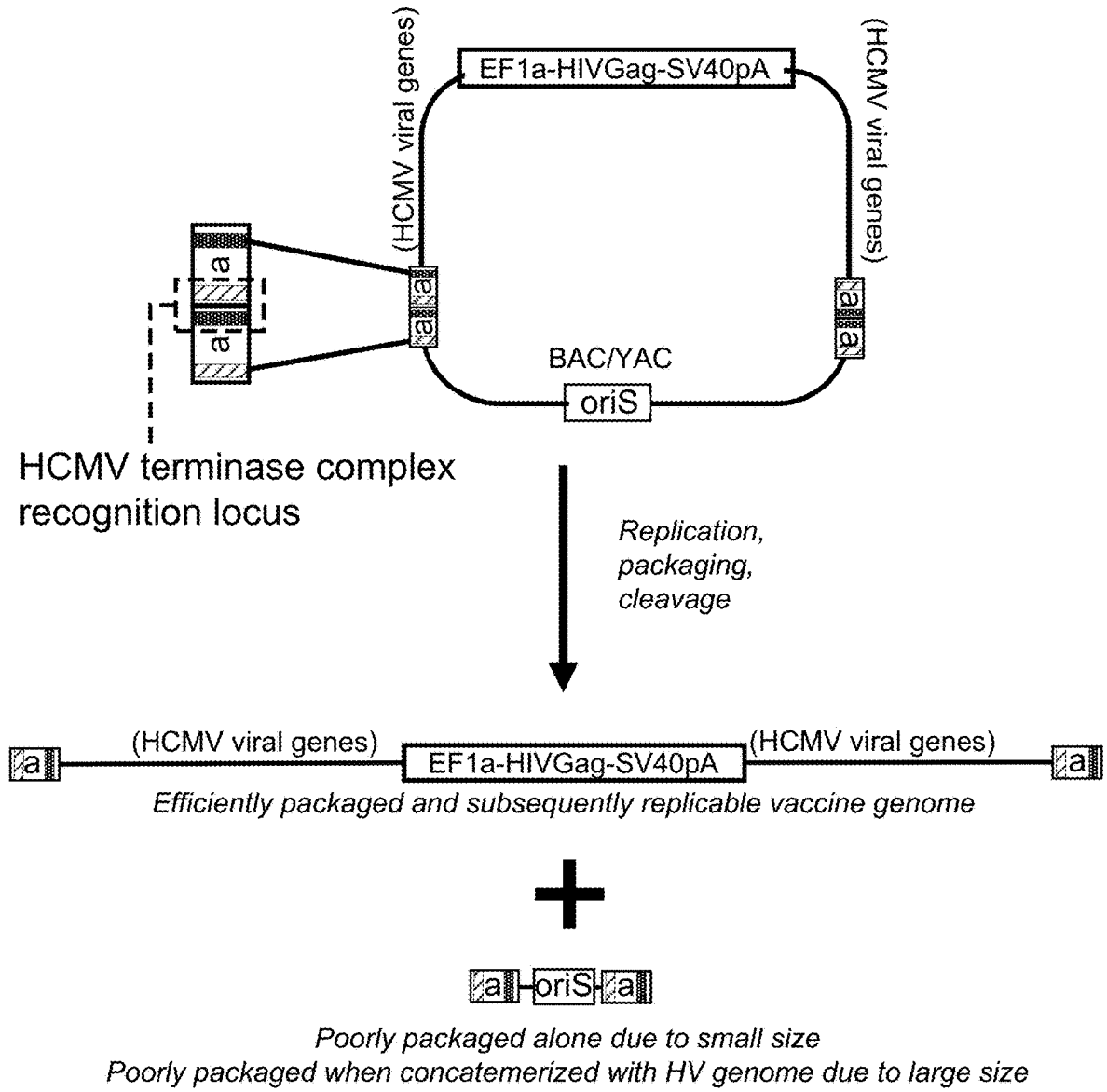
FIG. 7. A self-launching human CMV (HCMV) genome expressing HIV Gag and flanked by HCMV terminase complex recognition loci from the genome-terminal "a" sequence. Top, the arrangement of polynucleotide elements, including a human CMV genome carrying the heterologous HIV Gag antigen; two TCRLs each comprising two repeats of the HCMV a sequence and whose juxtaposition directs cleavage by HCMV terminase between the two repeats; and a bacterial artificial chromosome backbone (BAC) containing the oriS origin that functions in *E. coli*. Bottom, on replication of this genome cleavage often occurs within the TCRLs, releasing the HIV Gag-containing vaccine genome from the BAC and allowing its efficient packaging.
Figure 8:
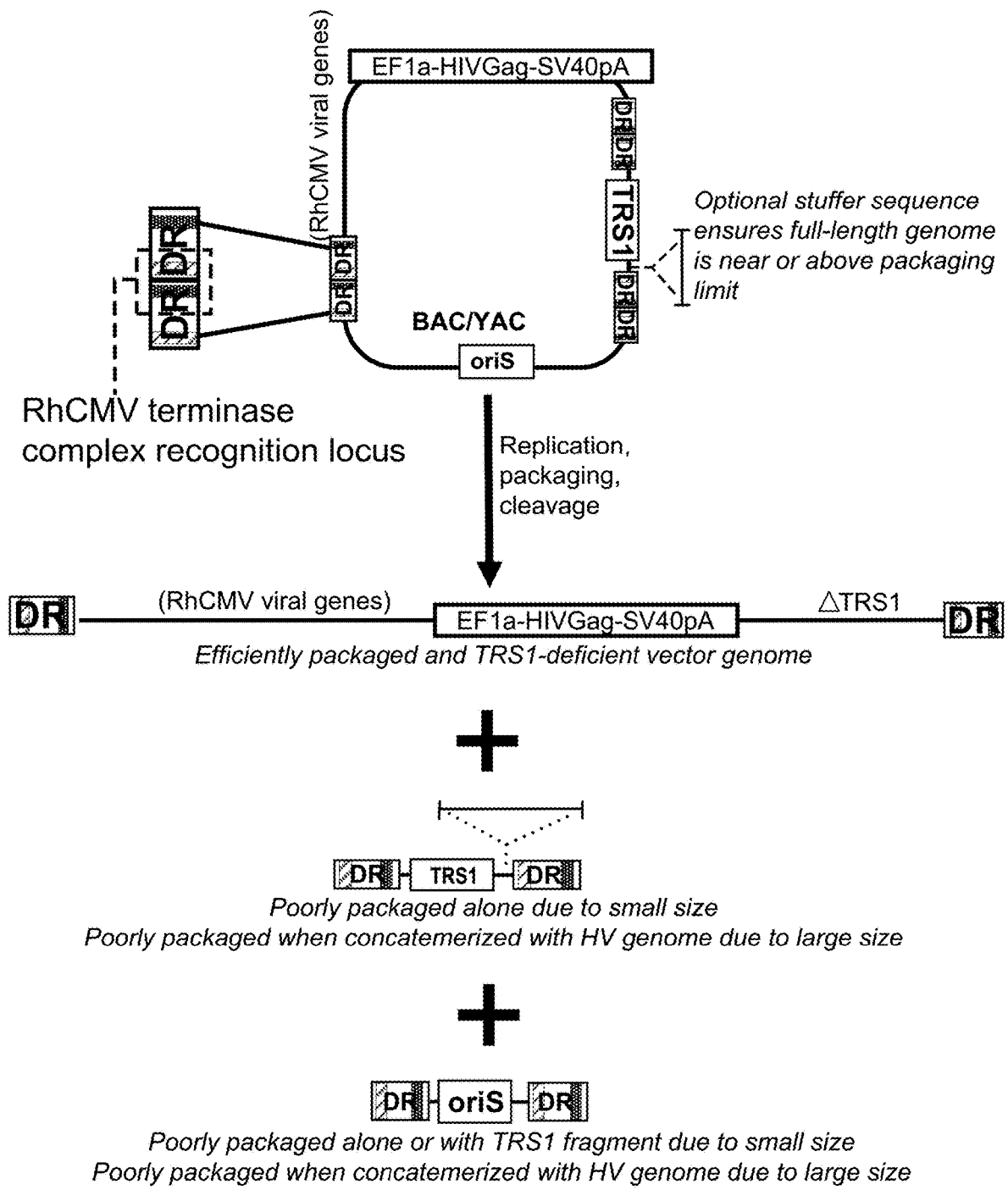
FIG. 8. Self-launching and self-inactivating *Rhesus* CMV (RhCMV) genome expressing HIV Gag and deleting the TRS1 gene through the introduction of a TCRL. Top, the arrangement of polynucleotide elements, including a *Rhesus* CMV (RhCMV) genome carrying both HIV Gag and an internal TCRL that is placed so as to direct deletion of the TRS1 gene on replication; two additional TCRLs each comprising two repeats of the RhCMV terminal direct repeat (DR) sequence and whose juxtaposition directs cleavage by RhCMV terminase between the two repeats, which are placed between the RhCMV genome and the BAC sequences; and a BAC backbone containing the oriS origin that functions in *E. coli*. Bottom, on replication of this genome cleavage often occurs so as to separate the TRS1 gene from the remainder of the genome. The remaining TRS1-deficient genome can be efficiently packaged and spread to other cells, while the TRS1 and BAC fragments are too short, separately or together, for efficient packaging.
Figure 9:
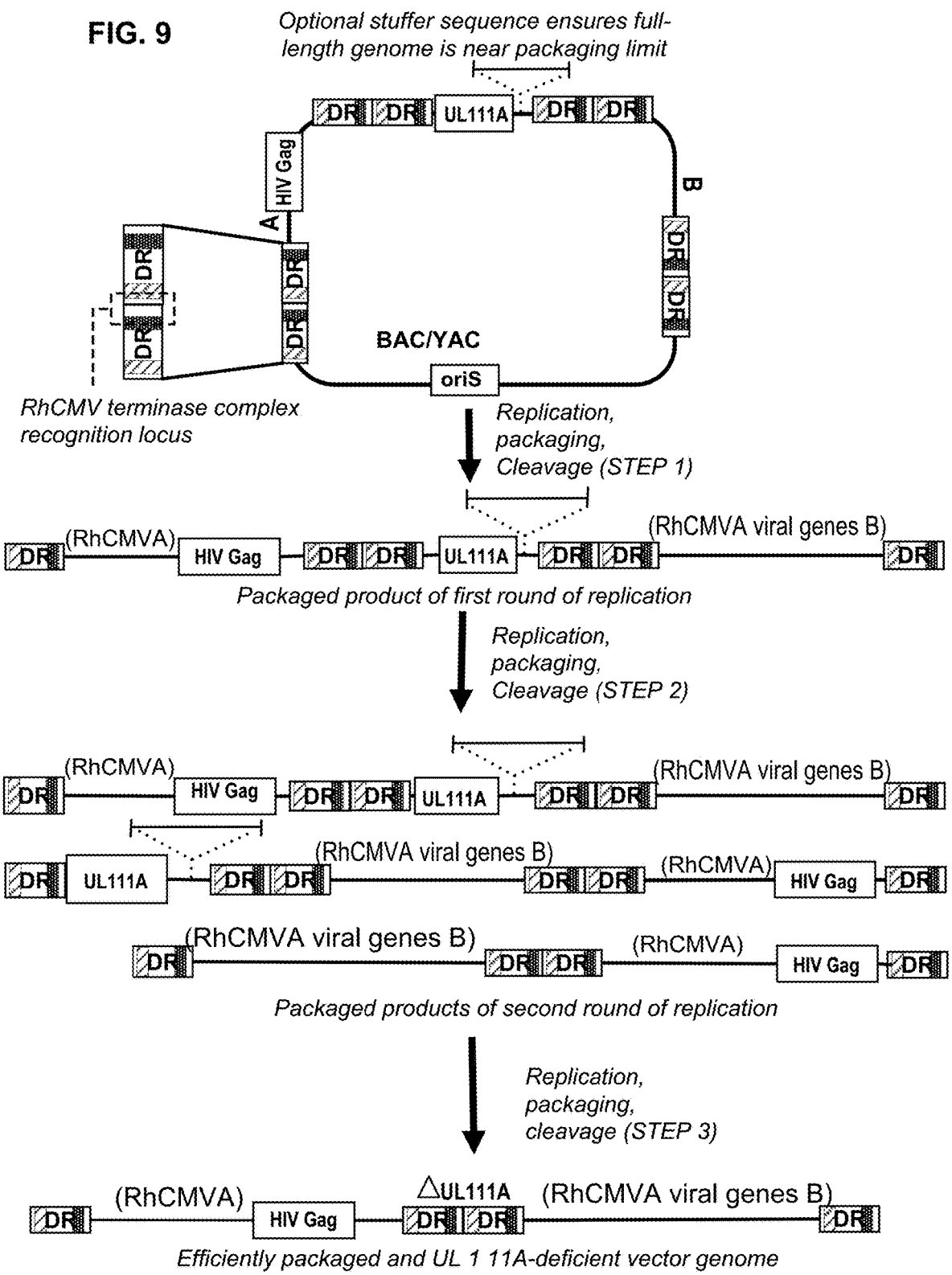
FIG. 9. Self-launching and self-inactivating *Rhesus* CMV (RhCMV) genome expressing HIV Gag and deleting the UL111A (viral IL-10) gene through the introduction of two TCRLs. Top, the arrangement of polynucleotide elements, including a *Rhesus* CMV (RhCMV) genome carrying both HIV Gag and two internal TCRLs that flank the UL111A gene and will direct its eventual deletion; two additional TCRLs each comprising two repeats of the RhCMV terminal direct repeat (DR) sequence and whose juxtaposition directs cleavage by RhCMV terminase between the two repeats, which are placed between the RhCMV genome and the BAC sequences; and a BAC backbone containing the oriS origin that functions in *E. coli*. Bottom, on a first round of replication the BAC backbone sequences will be eliminated in many cases due to the high or even excessive length of genomes incorporating them. On a second round of replication, cleavage can occur at many positions but packaged genomes will be of approximately full-genome length. Some will eliminate the UL111A locus by packaging a rearranged virus lacking that sequence, especially if a stuffer sequence is included so as to make the full-length genome approach the limit for packaging. On a final round of replication, UL111A-deficient vector genomes predominate, although remaining sequences may have different arrangements due to packaging in different phases.

RhCMVdIL10-SIVgag and -HIVgag vaccine genomes: Viral IL-10-deficient vaccine genomes are assessed carrying either SIV or HIV Gag and a plasmid backbone sequence that allows maintenance of the plasmid at approximately single copy (in DH10B cells employing oriS to maintain the plasmid), at ~15 copies per cell (in PIR2 cells employing R6Kgamma), or at ~250 copies per cell (in PIR1 cells employing R6Kgamma and carrying a mutant pir allowing higher copy number). The BAC DNA is purified by double sequential CsCl equilibrium gradient centrifugation followed by dialysis into PBS. LPS contamination is assessed using the ToxinSensor Chromogenic LAL Endotoxin Assay Kit from Genscript. Three strategies are employed to test the sequence integrity of these preparations:

(i) Restriction enzyme fingerprinting: Vaccine DNA preparations are digested with NotI, SalI, EcoRI and BamHI, as previously described (Ref 25), and restriction fragment lengths assessed by electrophoresis.

(ii) PCR amplification of species previously shown to contaminate RhCMV/SIV vaccine preps: We identified two deletions that are frequently found in RhCMV/SIV vaccine preps after in vitro expansion (see Results, above). We then designed sequence-specific primers that amplify a band only in the presence of these deletions. The frequency of such deletions in conventional RhCMV vs. plasmid preparations is assessed by quantitative RT-PCR.

(iii) Deep sequencing of each BAC with over 2000-fold coverage is performed by direct tagmentation (Nextera Flex library preparation kit; Illumina) followed by limited PCR amplification to incorporate indexes and adaptors. The products are purified using Agencourt AMPure XP beads (Beckman Coulter) to eliminate primers, primer-dimers, and library molecules with inserts shorter than 50 bp. The fragment length distribution is assessed with a BioAnalyzer 2100 (Agilent) and the libraries quantified with a Qubit fluorometer before pooling at equimolar concentrations. NGS is performed using the HiSeq 4000 or NovaSeq 6000 systems (Illumina) in the UC Davis DNA Technologies Core, with cluster generation as per manufacturer's instructions. Sequencing reads from each amplicon-defining barcode cluster are mapped onto a custom reference sequence (combining project-specific sequences with accession number AY186194.1) using Bowtie 2 (Ref 35). The Genome Analysis Toolkit (GATK; Ref. 36) is used to call SNPs.

Formulation of RhCMVdIL10-SIVgag and -HIVgag vaccine genomes as DNA, DNA:PEI, or DNA:PEI:Ad26: BAC DNA is formulated with in vivo-jetPEI (Polyplus) according to the instructions of the manufacturer and as demonstrated in FIG. 4, above. Briefly, 100 μg of BAC DNA (50 μg RhCMVdIL10-SIVgag and 50 μg RhCMVdIL10-HIVgag) and 16 μL in vivo-jetPEI reagent are separately diluted into 5% glucose solutions (1 ml), then mixed and incubated for 15 minutes at room temperature. For formulation as PEI:DNA:Ad26, we add 3×1011 particles of "empty" vectorized Ad26 (UV irradiated at 50 mJ/cm2; E1- and E3-deficient).

Administration of DNA, PEI:DNA, or PEI:DNA:Ad26 to *Rhesus* macaques: Three animals are given each formulation subcutaneously at 0 and 4 weeks (FIG. 6). Vector replication and immune responses is followed for 16 weeks after priming. The vaccines are delivered in two 1-mL volumes in two separate sites on the back of the animal, i.e., one each for SIVgag and HIVgag vaccines. The inoculation sites are marked with indelible ink for skin biopsy at nine days after priming as described (Ref. 15). Local inflammation and immune cell infiltration are assessed by standard IHC and immunofluorescence; persistence of viral genomes is assessed by DNAscope (FIG. 6). Peripheral blood samples are collected longitudinally after challenge at three days and then weekly. DNA is purified from plasma and replicating viral genomes are detected as described (Ref. 25).

Interpretation of data: Vaccine genomes prepared at 20-250 copies per bacterial cell are shown to demonstrate a stable nucleic acid sequence, without an appreciable increase in deletions or SNPs. Any significant sequence changes seen at higher copy number could be due to a destabilizing effect of higher copy number on DNA stability, due for example to an increased concentration of templates available for recombination or increased physiologic stress placed on a bacterium maintaining many copies of a large plasmid. Maintenance of vaccine genomes at high copy allows purification of DNA with reduced endotoxin contamination, permitting administration of more DNA to encourage replication.

Concerning the launching from DNA to replicating viral forms in vivo of our self-launching DNA vaccine constructs, which flank the bacterial origin of replication with recognition sites for the viral terminase complex, we have already demonstrated successful rescue of a conventional RhCMVdIL10-SIVgag BAC formulated as DNA:PEI:Ad26 (FIG. 5).

Statistical analysis: Differences in endotoxin levels of our six vaccine preparation types (two vaccine inserts×three copy-number levels) are assessed by multivariate linear regression. Each preparation is carried out in at least three runs beginning from established master *E. coli* cell banks. We carried out power calculations (R, pwr package's pwr.f2.test) using LPS data from our preliminary experiments and determined 87% power to detect a difference in LPS levels that is driven by plasmid copy number.

With respect to SNP detection, our previous experience suggests that single-copy BACs have mutation rates similar to those of other plasmids, that is, below the level of detection by amplicon sequencing (~0.1%, Refs. 37-41), which is imposed by the error rates of the polymerases used for the amplification and sequencing reactions. Nonetheless, an assumption of mutation rates near but below detection for single-copy BACs and linear scaling with copy number implies a large effect size (f2=0.5) and power of 80% to detect an effect.

Finally, vector replication is determined by detection of any of (i) gB protein expression in biopsy tissue, (ii) an anamnestic antibody response to gB, as defined by doubling of titer in the month following vaccination, or (iii) vaccine virus sequences in plasma one week after prime or boost. We performed Monte-Carlo simulation assuming a per-exposure chance of vaccine replication of 4%, 55%, or 90%, respectively, in groups A-C. 20,000 in silico replications of the experiment, and significance testing using the survival package's coxph test (log-likelihood) revealed a power of 81% to detect a difference between groups.

In cases where maintenance of vaccine BACs at medium or high copy number is found to be associated with mutations of varying degrees of severity, it is possible to simply fall back to maintenance of the DNA vaccine as a single-copy BAC under control of its oriS origin of replication.

Part II. Innate and adaptive immune responses to vaccination with nucleic-acid forms of RhCMVdIL10-SIVgag and -HIVgag are compared to protective anti-SIV responses observed previously with encapsidated live virus.

Using serially harvested PBMC and LNMC from macaques immunized with vaccine genomes, (i) early and late transcriptomic responses reflective of innate and mixed innate/adaptive responses, respectively, are evaluated; (ii) T-cell responses to the vaccine antigen are assessed; and (iii) phenotypic changes in immune cells that are characteristic of CMV-vectored vaccine recipients are detected.

Demonstrate that RhCMVdIL10-SIVgag and -HIVgag vaccines delivered as DNA but converted to replicating virus stimulate immune responses that are indistinguishable from the protective responses stimulated by encapsidated live vaccine.

Surprisingly, fibroblast tropism seems to be a key determinant of RhCMV/SIV vaccine efficacy, as only fibroblast-tropic strains such as 68-1 are protective. Subcutaneous delivery of nucleic-acid forms of the vaccines ensures delivery to a large contingent of fibroblasts, which upon replication will release additional fibroblast-tropic virus. Thus, successful vaccine launch from injected DNA involves immune responses virtually identical to those previously seen.

Experimental approach: Immune responses are evaluated in the nine macaques vaccinated in Part I, with particular focus on characteristic innate and adaptive responses associated with protection.

RNA sequencing is performed for samples collected at 0, 3, and 14 days, for comparability with our previous work. For reasons of cost, sample availability, and comparability with our previous data, 3'-Tag-Seq on total PBMC is initially performed. Libraries are prepared using QuantSeq (Lexogen) and sequenced in the UC Davis DNA Technologies Core, which performed the previous work using identical methods.

Immunophenotyping: The immunophenotypes of greatest interest are T cell memory-effector subsets, NK cells with adaptive characteristics (i.e., FcεRIγ low "memory" NK), T cells with adaptive characteristics (NKG2A+), and antigen-presenting cells, especially monocytes, expressing CD80/83/86. All of these cell populations are altered after wild-type or vaccine-strain RhCMV infection. All are assessed using a set of three flow cytometry panels used in our previously published work to examine antigen-presenting, T, and NK cells (Ref. 21).

Antigen-specific T cell responses: Assay wells containing up to 1M PBMC or LNMC cells are stimulated with vehicle (negative control for DMSO toxicity), overlapping SIVgag or HIVgag peptides (NIH HIV Reagent Resource), specific peptides with known Mamu-E restriction (e.g., SIVGag69, SIVGag18, SIVGag120, HIVGagRL9 [RMYSPVSIL]), or PMA/ionomycin (positive control). Inhibitors such as VL9 peptide or anti-HLA-antibodies are applied one hour before stimulation begins and added again with the peptide stimulus. After 16 h the cells are stained using fixable live-dead stain as well as antibodies reactive to CD3, CD4, CD8, CCR7, CD95, IL-2, IL-17, IFN-γ, and TNF-α. The fraction of cytokine-secreting $CD4^+$ and $CD8^+$ T cells is determined by cytometry on a BD LSR II in the Gladstone Institutes Flow Cytometry Core.

Anti-HIVgag and anti-SIVgag T-cell responses are compared, and in particular T-cell responses against the recently identified HLA-E-restricted peptide from HIVgag, RL9.42

Statistical analysis: The primary comparison of interest is comparison of immune responses in monkeys whose DNA vaccines replicate vs. those whose DNA vaccine do not replicate. Given the longitudinal data to be collected, generalized linear mixed models (GLMMs) are the over-arching analysis framework. Use of random effects accommodates the within-animal dependence induced by serial measurements. The primary outcomes are expansion of NKG2A-expressing $CD8^+$ T cells; the mean overall T-cell response to pooled SIVgag or HIVgag peptides; mean responses to the Mamu-E- and HLA-E-restricted peptides, Gag69 and RL9, and average summed responses to known Mamu-E- and HLA-E-restricted peptides. P values are corrected for multiple comparisons using the procedure of Benjamini and Hochberg (Ref. 43). In the Monte Carlo simulation described above we found that an average of 5.6 monkeys will experience vaccine vector replication (of 9 total). To cite one example, if five monkeys with replicating vaccine manifest typical expansion of $CD8^+NKG2A^+$ cells after vaccination (from 0.49%+/−0.44% to 5.6%+/−1.5%), then our power will be 81%.

To define transcriptomic features associated with vaccine replication, Tag-Seq data is subjected to variance modeling at the observational level and analyzed using the limma pipeline for moderated t-statistics and p values by empirical Bayes (limma-voom). Adjusted p values are then calculated and replication-associated features selected based on adj. p<0.05. Commonalities are assessed between these differentially expressed genes and those associated with vaccine-mediated protection by rotational gene set testing in R.

Example 3. Self-Launching Human CMV (HCMV) Genome Expressing HIV Gag and Flanked by HCMV Terminase Complex Recognition Loci From the Genome-Terminal "a" Sequence We construct an HCMV-vectored vaccine genome expressing HIV Gag and flanked by HCMV terminase complex recognition loci. HCMV genomes begin and end in a terminal direct repeat known as the "a" sequence, which contains pac1 and pac2 motifs near opposite ends. Junctions between two such sequences, i.e., a-a junctions, place the pac2 motif of the first a sequence near the pac1 motif of the second a sequence. Such junctions are recognized and cleaved by the HCMV terminase complex.

This vaccine is self-launching in the sense that the HCMV terminase complex can separate the vaccine genome from BAC/YAC backbone sequences without the need for any exogenous recombinase or nuclease. The genome is constructed using conventional molecular biology techniques. Briefly, an HCMV-vectored HIV Gag vaccine genome is prepared in circular form that carries (i) an expression cassette for HIV Gag (EF1alpha-Gag-SV40pA) 5' to the US28A gene and (ii) a loxP-flanked BAC origin of replication (from pBeloBAC11) between the US2 and US3 genes. This starting form of the vaccine genome carries two tandem copies of the a sequence, a-a. Recombineering is then used to replace the single a-a junctional sequence with two copies of that sequence separated by a second BAC origin conferring resistance to a second antibiotic, i.e., a-a-pBeloBAC-$kan^R$-a-a. The previous BAC origin in the US2-US3 region is then removed by maintenance of the plasmid in a Cre-expressing bacterial host, yielding the genome shown in FIG. 7.

We then show in tissue culture that this vaccine genome is more efficiently recovered as replicating virus than is the parent BAC vaccine genome. Two techniques are used: BAC-transfected cells are overlain and assessed for plaque formation, or the supernatant of such cells is assayed for the presence of virions. In both cases the self-launching vaccine genome is seen to more rapidly and efficiently convert to replicating virus. Although some BAC/YAC sequences may be inefficiently packaged, any such sequences are rapidly lost as the virus is passaged.

Finally, we inject this new vaccine genome or the parent genome from which it derives into monkeys subcutaneously, either (i) alone, (ii) in complex with the polycation, PEI, or (iii) in complex with PEI and delivered with adenoviral particles to assist in transfection and transport of vaccine genomes to the nucleus. We demonstrate the self-launching form of the vaccine yields immune responses that are more rapid and/or more robust than those stimulated by conventional vaccine genomes.

Example 4: Self-Launching and Self-Inactivating *Rhesus* CMV (RhCMV) Genome Deleting the TRS1 Gene Through the Introduction of a Terminase Complex Recognition Locus Although the RhCMV genome terminus has been less intensively investigated than the HCMV genome terminus, the two appear to have related structures, with the RhCMV terminal direct repeat (DR) containing pac1 and pac2 sequences. These sequences in close proximity, e.g., at DR-DR junctions, are recognized by the RhCMV terminase complex.

We create a self-inactivating vector by placement of a terminase complex recognition locus near the RhCMV TRS1 gene, leading to its deletion as explained below (FIG. 8). A DR-DR repeat is placed interior to the TRS1 gene, thereby providing an additional recognition locus for the terminase complex (terminase complex recognition locus or TCRL). When viral genomes are packaged, the terminase complex may cleave the viral genome so as to exclude the TRS1 gene, and/or the complex may cleave the viral genome at the normal site, maintaining TRS1. As the virus spreads, TRS1 is inevitably lost. The rate of loss can be controlled by adding a stuffer sequence near the TRS1 gene that is sufficiently large to decrease packaging of the genomes maintaining TRS1 into RhCMV's icosahedral capsid. The stuffer sequence therefore allows us to control the rate of gene deletion, with larger sequences that approach or exceed the normal capacity of the capsid favoring faster deletion, because in this case cutting the internal DR-DR repeat (so as to exclude TRS1) is favored.

Example 5: Self-Launching and Self-Inactivating *Rhesus* CMV (RhCMV) Genome Deleting the UL111A (Viral IL-10) Gene Through the Introduction of Two Terminase Complex Recognition Loci Deletion of an internal CMV gene requires introduction of two (flanking) terminase complex recognition loci (TCRLs). Because CMV capsids have both lower and upper packaging bounds, very short genomes, e.g., half genomes, are very inefficiently packaged. Thus the primary product of a first round of replication, packaging, and cleavage ("STEP 1" of FIG. 9) is a full-length genome that has been cleaved at the normal genomic termini. The second round of replication, in a new host cell, produces a number of genome species, some of which lack the UL111A gene ("STEP 2" of FIG. 9). Such genomes are packaged and released for infection of new host cells. In those cells the UL111A-deficient genomes are circularized as part of the normal replication process, linear concatemers are synthesized, and a variety of UL111A-deficient genome species are created. In the example shown ("STEP 3" of FIG. 9), the remaining viral genes have their normal order and a DR-DR sequence remains as a scar at the site of the deleted UL111A gene.

Comparison of FIGS. 8 and 9 suggests that deletion of an essential CMV gene using two TCRLs may permit at least three rounds of replication. In a vaccine recipient, such gradual self-inactivation of a vaccine genome will stimulate stronger immune response.

References (Examples 2-5)

1. Wang, D., D. C. Freed, X. He, F. Li, A. Tang, K. S. Cox, S. A. Dubey, S. Cole, et al., A replication-defective *Human cytomegalovirus* vaccine for prevention of congenital infection. Sci Transl Med, 2016. 8(362): p. 362ra145.
2. Haase, A. T., Early events in sexual transmission of HIV and SIV and opportunities for interventions. Annu Rev Med, 2011. 62: p. 127-39.
3. Lifson, J. D., J. L. Rossio, R. Arnaout, L. Li, T. L. Parks, D. K. Schneider, R. F. Kiser, V. J. Coalter, et al., Containment of simian immunodeficiency virus infection: cellular immune responses and protection from rechallenge following transient postinoculation antiretroviral treatment. J Virol, 2000. 74(6): p. 2584-93.
4. Saez-Cirion, A., C. Bacchus, L. Hocqueloux, V. Avettand-Fenoel, I. Girault, C. Lecuroux, V. Potard, P. Versmisse, et al., Post-Treatment HIV-1 Controllers with a Long-Term Term Virological Remission after the Interruption of Early Initiated Antiretroviral Therapy ANRS VISCONTI Study. PLoS Pathog, 2013. 9(3): p. e1003211.
5. Van Rompay, K. K., L. Durand-Gasselin, L. L. Brignolo, A. S. Ray, K. Abel, T. Cihlar, A. Spinner, C. Jerome, et al., Chronic administration of tenofovir to *Rhesus* macaques from infancy through adulthood and pregnancy: summary of pharmacokinetics and biological and virological effects. Antimicrobial agents and chemotherapy, 2008. 52(9): p. 3144-60.
6. Van Rompay, K. K., M. B. McChesney, N. L. Aguirre, K. A. Schmidt, N. Bischofberger, and M. L. Marthas, Two low doses of tenofovir protect newborn macaques against oral simian immunodeficiency virus infection. J Infect Dis, 2001. 184(4): p. 429-38.
7. Van Rompay, K. K., K. A. Trott, K. Jayashankar, Y. Geng, C. C. LaBranche, J. A. Johnson, G. Landucci, J. Lipscomb, et al., Prolonged tenofovir treatment of macaques infected with K65R reverse transcriptase mutants of SIV results in the development of antiviral immune responses that control virus replication after drug withdrawal. Retrovirology, 2012. 9: p. 57.
8. Hansen, S. G., J. C. Ford, M. S. Lewis, A. B. Ventura, C. M. Hughes, L. Coyne-Johnson, N. Whizin, K. Oswald, et al., Profound early control of highly pathogenic SIV by an effector memory T-cell vaccine. Nature, 2011. 473(7348): p. 523-7.
9. Hansen, S. G., J. B. Sacha, C. M. Hughes, J. C. Ford, B. J. Burwitz, I. Scholz, R. M. Gilbride, M. S. Lewis, et al., *Cytomegalovirus* vectors violate CD8+ T cell epitope recognition paradigms. Science, 2013. 340(6135): p. 1237874.
10. Hansen, S. G., C. Vieville, N. Whizin, L. Coyne-Johnson, D. C. Siess, D. D. Drummond, A. W. Legasse, M. K. Axthelm, et al., Effector memory T cell responses are associated with protection of *Rhesus* monkeys from mucosal simian immunodeficiency virus challenge. Nat Med, 2009. 15(3): p. 293-9.
11. Hansen, S. G., M. Piatak, Jr., A. B. Ventura, C. M. Hughes, R. M. Gilbride, J. C. Ford, K. Oswald, R. Shoemaker, et al., Immune clearance of highly pathogenic SIV infection. Nature, 2013. 502(7469): p. 100-4.
12. Hansen, S. G., H. L. Wu, B. J. Burwitz, C. M. Hughes, K. B. Hammond, A. B. Ventura, J. S. Reed, R. M. Gilbride, et al., Broadly targeted CD8(+) T cell responses restricted by major histocompatibility complex E. Science, 2016. 351(6274): p. 714-20.
13. Barouch, D. H. and L. J. Picker, Consortia for Innovative AIDS Research in Nonhuman Primates. 2016, NIH/NIAID: Beth Israel Deaconess Medical Center.
14. Gale, M., Jr., Protective Gene Expression Signature in Response to RhCMV/SIV Vaccine Vectors, in Conference on Retroviruses and Opportunistic Infections. 2018: Boston, MA, USA.
15. Chang, W. L. and P. A. Barry, Attenuation of innate immunity by *Cytomegalovirus* IL-10 establishes a long-term deficit of adaptive antiviral immunity. Proc Natl Acad Sci USA, 2010. 107(52): p. 22647-52.
16. Slobedman, B., P. A. Barry, J. V. Spencer, S. Avdic, and A. Abendroth, Virus-encoded homologs of cellular interleukin-10 and their control of host immune function. J Virol, 2009. 83(19): p. 9618-29.
17. Spencer, J. V., K. M. Lockridge, P. A. Barry, G. Lin, M. Tsang, M. E. Penfold, and T. J. Schall, Potent immunosuppressive activities of *Cytomegalovirus*-encoded interleukin-10. J Virol, 2002. 76(3): p. 1285-92.
18. Logsdon, N. J., M. K. Eberhardt, C. E. Allen, P. A. Barry, and M. R. Walter, Design and analysis of *Rhesus cytomegalovirus* IL-10 mutants as a model for novel vaccines against *Human cytomegalovirus*. PLoS One, 2011. 6(11): p. e28127.
19. Yue, Y., A. Kaur, M. K. Eberhardt, N. Kassis, S. S. Zhou, A. F. Tarantal, and P. A. Barry, Immunogenicity and protective efficacy of DNA vaccines expressing *Rhesus cytomegalovirus* glycoprotein B, phosphoprotein 65-2, and viral interleukin-10 in *Rhesus* macaques. J Virol, 2007. 81(3): p. 1095-109.
20. Vashee, S., T. B. Stockwell, N. Alperovich, E. A. Denisova, D. G. Gibson, K. C. Cady, K. Miller, K. Kannan, et al., Cloning, Assembly, and Modification of the Primary *Human Cytomegalovirus* Isolate Toledo by Yeast-Based Transformation-Associated Recombination. mSphere, 2017. 2(5).
21. Ardeshir, A., N. R. Narayan, G. Mendez-Lagares, D. Lu, M. Rauch, Y. Huang, K. K. Van Rompay, S. V. Lynch, and D. J. Hartigan-O'Connor, Breast-fed and bottle-fed infant *Rhesus* macaques develop distinct gut microbiotas and immune systems. Sci Transl Med, 2014. 6(252): p. 252ra120.
22. Hartigan-O'Connor, D., C. J. Kirk, R. Crawford, J. J. MulV©, and J. S. Chamberlain, Immune evasion by muscle-specific gene expression in dystrophic muscle. Molecular therapy, 2001. 4(6): p. 525-33.
23. Hartigan-O'Connor, D. J., M. A. Jacobson, Q. X. Tan, and E. Sinclair, Development of *Cytomegalovirus* (CMV) immune recovery uveitis is associated with Th17 cell depletion and poor systemic CMV-specific T cell responses. Clin Infect Dis, 2011. 52(3): p. 409-17.
24. Santos Rocha, C., L. A. Hirao, M. G. Weber, G. Mendez-Lagares, W. L. W. Chang, G. Jiang, J. D. Deere, E. E. Sparger, et al., Subclinical *Cytomegalovirus* infection associates with altered host immunity, gut microbiota and vaccine responses. J Virol, 2018.
25. Chang, W. L. and P. A. Barry, Cloning of the full-length *Rhesus cytomegalovirus* genome as an infectious and self-excisable bacterial artificial chromosome for analysis of viral pathogenesis. J Virol, 2003. 77(9): p. 5073-83.
26. Asher, D. M., C. J. Gibbs, Jr., D. J. Lang, D. C. Gajdusek, and R. M. Chanock, Persistent shedding of *Cytomegalovirus* in the urine of healthy *Rhesus* monkeys. Proc Soc Exp Biol Med, 1974. 145(3): p. 794-801.
27. Hansen, S. G., L. I. Strelow, D. C. Franchi, D. G. Anders, and S. W. Wong, Complete sequence and genomic analysis of *Rhesus cytomegalovirus*. J Virol, 2003. 77(12): p. 6620-36.
28. Oxford, K. L., L. Strelow, Y. Yue, W. L. Chang, K. A. Schmidt, D. J. Diamond, and P. A. Barry, Open reading frames carried on UL/b' are implicated in shedding and horizontal transmission of *Rhesus cytomegalovirus* in *Rhesus* monkeys. J Virol, 2011. 85(10): p. 5105-14.
29. Tarantal, A. F., M. S. Salamat, W. J. Britt, P. A. Luciw, A. G. Hendrickx, and P. A. Barry, Neuropathogenesis induced by *Rhesus cytomegalovirus* in fetal *Rhesus* monkeys (*Macaca mulatta*). J Infect Dis, 1998. 177(2): p. 446-50.
30. Huang, E. S., S. M. Huong, G. E. Tegtmeier, and C. Alford, *Cytomegalovirus*: genetic variation of viral genomes. Ann N Y Acad Sci, 1980. 354: p. 332-46.

31. Renzette, N., L. Gibson, B. Bhattacharjee, D. Fisher, M. R. Schleiss, J. D. Jensen, and T. F. Kowalik, Rapid intrahost evolution of *Human cytomegalovirus* is shaped by demography and positive selection. PLoS Genet, 2013. 9(9): p. e1003735.
32. Renzette, N., L. Gibson, J. D. Jensen, and T. F. Kowalik, *Human cytomegalovirus* intrahost evolution-a new avenue for understanding and controlling herpesvirus infections. Curr Opin Virol, 2014. 8: p. 109-15.
33. Cunningham, C., D. Gatherer, B. Hilfrich, K. Baluchova, D. J. Dargan, M. Thomson, P. D. Griffiths, G. W. Wilkinson, et al., Sequences of complete *Human cytomegalovirus* genomes from infected cell cultures and clinical specimens. J Gen Virol, 2010. 91(Pt 3): p. 605-15.
34. Wild, J., Z. Hradecna, and W. Szybalski, Conditionally amplifiable BACs: switching from single-copy to high-copy vectors and genomic clones. Genome Res, 2002. 12(9): p. 1434-44.
35. Langmead, B. and S. L. Salzberg, Fast gapped-read alignment with Bowtie 2. Nat Methods, 2012. 9(4): p. 357-9.
36. Institute, B. Genome Analysis Toolkit. 2019 [cited 2019 Apr. 19, 2019]; Available from: https://software.broadinstitute.org/gatk/.
37. Bansal, V., A statistical method for the detection of variants from next-generation resequencing of DNA pools. Bioinformatics, 2010. 26(12): p. i318-24.
38. Lan, F., J. R. Haliburton, A. Yuan, and A. R. Abate, Droplet barcoding for massively parallel single-molecule deep sequencing. Nat Commun, 2016. 7: p. 11784.
39. Nielsen, R., J. S. Paul, A. Albrechtsen, and Y. S. Song, Genotype and SNP calling from next-generation sequencing data. Nat Rev Genet, 2011. 12(6): p. 443-51.
40. Simen, B. B., J. F. Simons, K. H. Hullsiek, R. M. Novak, R. D. Macarthur, J. D. Baxter, C. Huang, C. Lubeski, et al., Low-abundance drug-resistant viral variants in chronically HIV-infected, antiretroviral treatment-naive patients significantly impact treatment outcomes. J Infect Dis, 2009. 199(5): p. 693-701.
41. Stasik, S., C. Schuster, C. Ortlepp, U. Platzbecker, M. Bornhauser, J. Schetelig, G. Ehninger, G. Folprecht, and C. Thiede, An optimized targeted Next-Generation Sequencing approach for sensitive detection of single nucleotide variants. Biomol Detect Quantif, 2018. 15: p. 6-12.
42. Hannoun, Z., Z. Lin, S. Brackenridge, N. Kuse, T. Akahoshi, N. Borthwick, A. McMichael, H. Murakoshi, et al., Identification of novel HIV-1-derived HLA-E-binding peptides. Immunol Lett, 2018. 202: p. 65-72.
43. Benjamini, Y. and Y. Hochberg, Controlling the false discovery rate: a practical and powerful approach to multiple testing. Journal of the Royal Statistical Society. Series B (Methodological), 1995. 57: p. 289-300.

Example 6. Superior Conversion of Self-Launching CMV DNA to Replicating Virus In Vitro One goal of this work is to provide herpesvirus genomes that are more efficiently converted to replicating forms in vivo and in vitro. In vivo, superior conversion provides more replicating genomes that express greater amounts of, e.g., vaccine antigens. In vitro, more efficient conversion allows for rapid growth of CMV from a DNA starting material, using fewer passages of virus from cell to cell, thereby preventing recombinations that could otherwise occur, as shown in FIG. 1. For example, some BAC forms of herpesvirus genomes provided here can be converted to a replicating viral form 20 times more efficiently than conventional herpesvirus genomes in BAC form; in these cases, 20-fold less expansion in tissue culture is required, e.g., for production of a live, encapsidated vaccine stock. In addition, administration of such herpesvirus genomes directly to a subject will result in production of 20 times more live vaccine and thus to greater immune responses.

Figure 10B:
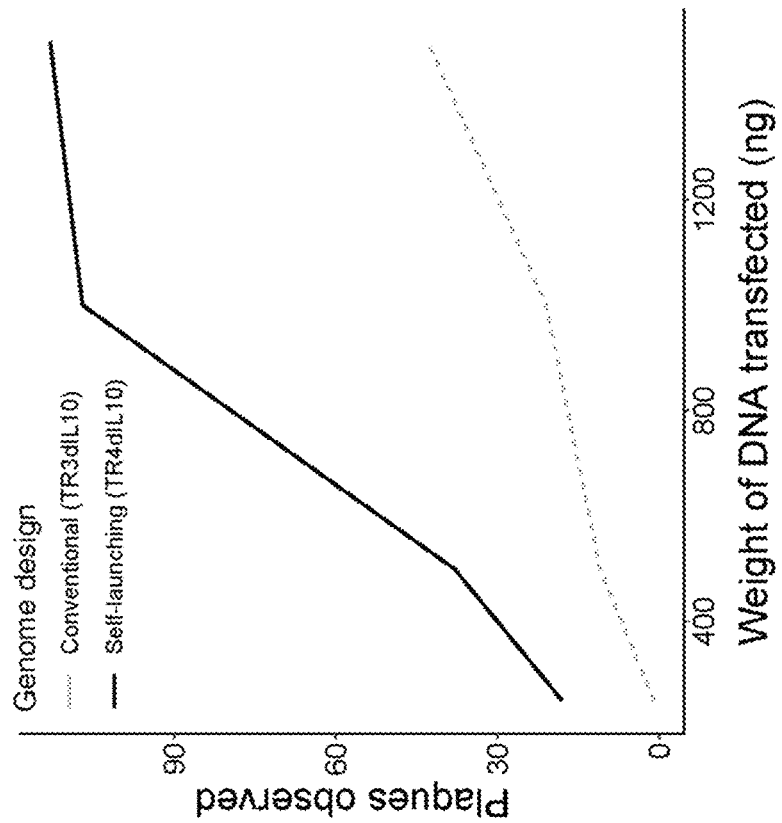
FIGS. 10A-B. Introduction of terminase complex recognition loci (TCRLs) surrounding the BAC origin of replication provides superior conversion of CMV BAC genomic DNA to replicating virus in vitro.
Figure 10A:
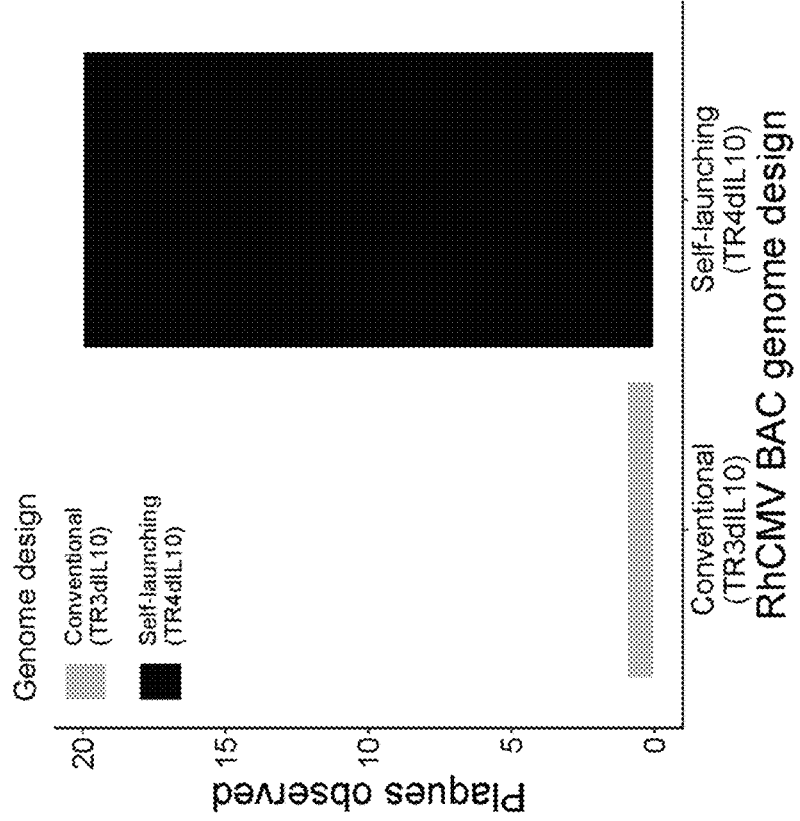

In this example, we created a self-launching form of the *Rhesus cytomegalovirus* (RhCMV) genome, in which the BAC origin of replication is surrounded by TCRLs at each extremity, each TCRL comprising two terminal repeats (TRs) as in FIG. 2D. To engineer this arrangement, two sets of two TRs were cloned into a BAC, separated by DNA sequences that are homologous to the two unique terminal sequences of RhCMV. After linearization of this BAC and recombination into a conventional BAC containing the RhCMV 68-1 genome, we achieved the arrangement shown in FIG. 2D. Because the RhCMV genome chosen for this work carries a deletion in the viral IL-10 gene, the conventional BAC in this example is termed "TR3dIL10" and the self-launching BAC is termed "TR4dIL10". These two BACs were then transfected into cells under identical circumstances, in order to test the efficiency with which they are converted to replicating forms, allowing formation of plaques. The goal was to test if TR4dIL10 was capable of more efficient replication as reflected in plaque formation. Indeed, when tested using two different transfection techniques and a range of DNA concentrations, the self-launching RhCMV BAC DNA construct, TR4dIL10, is more efficiently converted to replicating virus. Using FuGene 6, transfection of one microgram of TR3dIL10 produced only one plaque; transfection of the same amount of TR4dIL10 produced 20 plaques (FIG. 10A). Using calcium phosphate, transfection of varying amounts of input DNA led invariably to more efficient replication and thus plaque formation by the self-launching RhCMV BAC genomic DNA, TR4dIL10 (FIG. 10B). At the lowest DNA input amount, 250 ng, TR3dIL10 produced only one plaque while TR4dIL10 produced 18 plaques.

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference.

What is claimed is:

1. A recombinant polynucleotide comprising:
    (a) a *Cytomegalovirus* (CMV) genome;
    (b) a sequence comprising a bacterial artificial chromosome (BAC) origin of replication; and
    (c) two terminase complex recognition loci (TCRL) that flank the sequence comprising the BAC origin of replication, where each TCRL comprises two terminal repeats each comprising Pac1 and Pac2 sites;
    wherein:
    the CMV genome is separated from the sequence comprising the BAC origin of replication by the two TCRLs; and
    the polynucleotide is circular.
2. The recombinant polynucleotide of claim 1, wherein the sequence comprising the BAC origin of replication further comprises a nucleic acid sequence encoding one or more CMV replication proteins.
3. The recombinant polynucleotide of claim 2, wherein the one or more CMV replication proteins are selected from the group consisting of HCMV proteins UL44, UL54, UL57, UL70, UL84, UL102, UL105, IE2, UL36, UL37, UL38, UL112-113, IRS1/TRS1, or homologs thereof.

4. The recombinant polynucleotide of claim 1, wherein the CMV genome comprises a nucleic acid sequence encoding a heterologous antigen.

5. The recombinant polynucleotide of claim 1, wherein the recombinant polynucleotide can be cleaved by terminase action at the two TCRLs.

6. The recombinant polynucleotide of claim 1, wherein cleavage of the recombinant polynucleotide by terminase action leads to the separation of the CMV genome from the sequence comprising the BAC origin of replication.

7. The recombinant polynucleotide of claim 1, wherein one or more genes in the CMV genome is inactivated or deleted.

8. The recombinant polynucleotide of claim 7, wherein the one or more genes in the CMV genome is inactivated or deleted through the introduction of one or more TCRLs near or within the one or more genes.

9. The recombinant polynucleotide of claim 7, wherein the sequence comprising the BAC origin of replication further comprises a nucleic acid sequence comprising the one or more inactivated or deleted genes.

10. The recombinant polynucleotide of claim 7, wherein the one or more inactivated or deleted genes are involved in viral replication or spread.

11. The recombinant polynucleotide of claim 7, wherein the one or more inactivated or deleted genes are selected from the group consisting of glycoprotein B, glycoprotein D, glycoprotein H, glycoprotein L, IE1/2, UL51, UL52, U79, UL84, UL87, and a combination thereof.

12. The recombinant polynucleotide of claim 4, wherein the antigen is an infectious disease antigen.

13. The recombinant polynucleotide of claim 12, wherein the infectious disease antigen is a bacterial, viral, fungal, protozoal, and/or helminthic infectious disease antigen.

14. The recombinant polynucleotide of claim 12, wherein the infectious disease antigen is a viral infectious disease antigen from simian immunodeficiency virus (SIV), human immunodeficiency virus (HIV), hepatitis C virus, herpes simplex virus, Epstein-Barr virus, or a combination thereof.

15. The recombinant polynucleotide of claim 12, wherein the infectious disease antigen comprises an HIV or SIV group-specific antigen (gag) protein.

16. The recombinant polynucleotide of claim 12, wherein the infectious disease antigen is a bacterial infectious disease antigen from *Mycobacterium tuberculosis*.

17. The recombinant polynucleotide of claim 4, wherein the antigen is a tumor-associated antigen.

18. The recombinant polynucleotide of claim 17, wherein the tumor-associated antigen is selected from the group consisting of prostate-specific antigen, melanoma-associated antigen 4 (MAGEA4), melanoma-associated antigen 10 (MAGEA10), NY-ESO-1, a neoantigen, and a combination thereof.

19. The recombinant polynucleotide of claim 1, wherein the CMV genome comprises a nucleic acid sequence encoding a heterologous antigen, and wherein
one or more TCRLs are introduced between or within one or more genes within the CMV genome such that terminase action on the one or more introduced TCRLs leads to the inactivation or deletion of the one or more genes within the CMV genome.

20. The recombinant polynucleotide of claim 19, wherein the one or more inactivated or deleted genes are involved in viral replication or spread.

21. The recombinant polynucleotide of claim 19, wherein the one or more inactivated or deleted genes are selected from the group consisting of glycoprotein B, glycoprotein D, glycoprotein H, glycoprotein L, IE1/2, UL51, UL52, U79, UL84, UL87, and a combination thereof.

22. The recombinant polynucleotide of claim 19, wherein the sequence comprising the BAC origin of replication further comprises a nucleic acid sequence encoding an CMV replication protein.

23. The recombinant polynucleotide of claim 22, wherein the CMV replication protein is selected from the group consisting of HCMV proteins UL44, UL54, UL57, UL70, UL84, UL102, UL105, IE2, UL36, UL37, UL38, UL112-113, IRS1/TRS1, or a homolog thereof.

24. The recombinant polynucleotide of claim 19, wherein the heterologous antigen is an infectious disease antigen.

25. The recombinant polynucleotide of claim 24, wherein the infectious disease antigen is a bacterial, viral, fungal, protozoal, and/or helminthic infectious disease antigen.

26. The recombinant polynucleotide of claim 24, wherein the infectious disease antigen is a viral infectious disease antigen from simian immunodeficiency virus (SIV), human immunodeficiency virus (HIV), hepatitis C virus, herpes simplex virus, Epstein-Barr virus, or a combination thereof.

27. The recombinant polynucleotide of claim 24, wherein the infectious disease antigen comprises an HIV or SIV group-specific antigen (gag) protein.

28. The recombinant polynucleotide of claim 24, wherein the infectious disease antigen is a bacterial infectious disease antigen from *Mycobacterium tuberculosis*.

29. The recombinant polynucleotide of claim 19, wherein the heterologous antigen is a tumor-associated antigen.

30. The recombinant polynucleotide of claim 29, wherein the tumor-associated antigen is selected from the group consisting of prostate-specific antigen, melanoma-associated antigen 4 (MAGEA4), melanoma-associated antigen 10 (MAGEA10), NY-ESO-1, a neoantigen, and a combination thereof.

31. A system comprising:
  (a) the recombinant polynucleotide of claim 1, and
  (b) a non-viral or viral delivery agent.

32. A system comprising:
  (a) the recombinant polynucleotide of claim 7, and
  (b) a viral delivery agent comprising a genome or portion thereof that contains the nucleic acid sequence of the one or more inactivated or deleted genes.

33. The system of claim 31, wherein the viral delivery agent is an adenovirus (Ad).

34. A method for inducing an immune response against an antigen in a subject, the method comprising administering to the subject a therapeutically effective amount of the recombinant polynucleotide of claim 4.

35. The method of claim 34, wherein the antigen is an infectious disease antigen.

36. The method of claim 35, wherein the infectious disease antigen is a bacterial, viral, fungal, protozoal, and/or helminthic infectious disease antigen.

37. The method of claim 34, wherein the antigen is a tumor-associated antigen.

38. A method for preventing or treating a disease in a subject, the method comprising inducing an immune response against an antigen in the subject according to the method of claim 34.

* * * * *